(12) United States Patent
Nii et al.

(10) Patent No.: US 10,717,814 B2
(45) Date of Patent: Jul. 21, 2020

(54) POLYCARBONATE RESIN AND PRODUCTION METHOD THEREFOR

(71) Applicant: MITSUBISHI GAS CHEMICAL COMPANY, INC., Tokyo (JP)

(72) Inventors: Yuusuke Nii, Ibaraki (JP); Shun Ishikawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 17 days.

(21) Appl. No.: 16/078,454

(22) PCT Filed: Feb. 21, 2017

(86) PCT No.: PCT/JP2017/006384
§ 371 (c)(1),
(2) Date: Aug. 21, 2018

(87) PCT Pub. No.: WO2017/150276
PCT Pub. Date: Sep. 8, 2017

(65) Prior Publication Data
US 2019/0023840 A1    Jan. 24, 2019

(30) Foreign Application Priority Data

Feb. 29, 2016  (JP) .................................. 2016-037849
Feb. 29, 2016  (JP) .................................. 2016-037850

(51) Int. Cl.
| | | |
|---|---|---|
| C08G 64/02 | (2006.01) | |
| C08G 64/14 | (2006.01) | |
| C08G 64/42 | (2006.01) | |
| C08K 3/24 | (2006.01) | |
| C08K 5/02 | (2006.01) | |

(52) U.S. Cl.
CPC ............. C08G 64/14 (2013.01); C08G 64/42 (2013.01); C08K 3/24 (2013.01); C08K 5/02 (2013.01)

(58) Field of Classification Search
USPC ................................................ 528/196, 198
See application file for complete search history.

(56) References Cited

U.S. PATENT DOCUMENTS

| 5,747,632 A | 5/1998 | Adachi et al. |
|---|---|---|
| 2007/0155888 A1 | 7/2007 | Imamura et al. |

FOREIGN PATENT DOCUMENTS

| CN | 107428924 A | 12/2017 |
|---|---|---|
| JP | 63-278929 A | 11/1988 |
| JP | 1-146926 A | 6/1989 |
| JP | 01-275629 A | 11/1989 |
| JP | 4-198213 A | 7/1992 |
| JP | 6-222183 A | 8/1993 |
| JP | 7-138356 A | 5/1995 |
| JP | 08-325369 A | 12/1996 |
| JP | 09-208684 A | 8/1997 |
| JP | 2001-208917 A | 8/2001 |
| JP | 2001-316467 A | 11/2001 |
| JP | 2002-105190 A | 4/2002 |
| JP | 2002-302543 A | 10/2002 |
| JP | 2009-096117 A | 5/2009 |
| JP | 2015-189900 A | 11/2015 |
| WO | 2005/082972 A1 | 9/2005 |
| WO | 2015/147198 A1 | 10/2015 |

OTHER PUBLICATIONS

International Search Report in International Patent Application No. PCT/JP2017/006384, dated May 23, 2017.
International Preliminary Report on Patentability in International Patent Application No. PCT/JP2017/006384, dated Sep. 4, 2018.
Extended European Search Report in EP Application No. 17759742.4 dated Aug. 23, 2019.

*Primary Examiner* — Terressa Boykin
(74) *Attorney, Agent, or Firm* — Greenblum & Bernstein, P.L.C.

(57) ABSTRACT

The purpose of the present invention is to provide a polycarbonate resin which has high fluidity and with which mold fouling such as mold deposits, etc., can be reduced. The polycarbonate resin according to the present invention has a terminal structure represented by general formula (1), and a viscosity-average molecular weight of 10,000-18,000, wherein the contained amount of low-molecular-weight carbonate compounds having a molecular weight of 1,000 or less contained in the polycarbonate resin is less than 1 mass %.

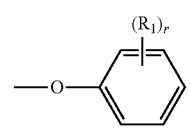

(1)

20 Claims, No Drawings

US 10,717,814 B2

POLYCARBONATE RESIN AND PRODUCTION METHOD THEREFOR

FIELD OF THE INVENTION

The present invention relates to a polycarbonate resin which has high fluidity and with which mold fouling such as mold deposits can be reduced. The present invention also relates to a simple method for producing a polycarbonate resin in which the amount of a low-molecular-weight carbonate compound having a molecular weight of 1,000 or less contained in the polycarbonate resin is less than 1 mass %, which has high fluidity and with which mold fouling such as mold deposits can be reduced.

BACKGROUND ART

Besides excellent optical characteristics, polycarbonates (PC) have low equilibrium water absorption and excellent mechanical characteristics such as heat resistance, dimensional stability and impact strength, and thus are used as materials for molding an optical part such as a light guide plate, an optical substrate material, a lens and fiber. For example, high quality PC is required for an optical information recording medium in terms of less stamper fouling upon fabricating a substrate, improvement of transferability, durability of the recording film, long-term reliability of the PC substrate itself and else. In response to such a demand, Japanese Unexamined Patent Application Publication No. Heisei 9-208684 (Patent document 1) proposes to obtain a high fluidity polycarbonate resin for an optical recoding medium, which has less low-molecular-weight carbonate compound and less polycarbonate oligomer in the polycarbonate resin and which hardly generates matters that adhere to the stamper, by forming a reaction mixture by blowing phosgene into bisphenol, adding a quaternary ammonium salt to that reaction mixture to allow polymerization for a predetermined molecular weight, and then adding a molecular weight modifier (terminating agent).

Another example for producing a high quality polycarbonate resin is proposed in Japanese Unexamined Patent Application Publication No. Heisei 1-275629 (Patent document 2) in which two types of molecular weight modifiers, namely, terminating agents are used to produce a polycarbonate having improved balance between fluidity and impact resistance. In addition, Japanese Unexamined Patent Application Publication No. 2001-208917 (Patent document 3) proposes use of a polycarbonate having excellent fluidity and mechanical strength for a light guide plate.

Furthermore, Japanese Unexamined Patent Application Publication No. Heisei 8-325369 (Patent document 4) and Japanese Unexamined Patent Application Publication No. 2002-105190 (Patent document 5) disclose a method for reducing the amount of a low-molecular-weight carbonate compound having a molecular weight of 1,000 or less contained in a polycarbonate resin.

PRIOR ART DOCUMENTS

Patent Documents

Patent document 1: Japanese Unexamined Patent Application Publication No. Heisei 9-208684
Patent document 2: Japanese Unexamined Patent Application Publication No. Heisei 1-275629
Patent document 3: Japanese Unexamined Patent Application Publication No. 2001-208917
Patent document 4: Japanese Unexamined Patent Application Publication No. Heisei 8-325369
Patent document 5: Japanese Unexamined Patent Application Publication No. 2002-105190

SUMMARY OF INVENTION

Problem to be Solved by Invention

However, in order to produce a complicated and thinned product with a polycarbonate resin, an anti-mold fouling property is required that is higher than that for producing an optical information recording medium like the one described in Patent document 1. Specifically, since a stamper is used to transfer a pattern onto a polycarbonate resin for producing an optical information medium, the anti-mold fouling property of the surface (upper surface) making contact with the stamper upon pressurization needs to be high. In the meantime, in order to produce a complicated and thinned product, not only the surface making contact with the mold but also the sides as the edges of the flow need to have a high anti-mold fouling property.

Furthermore, when a thin large-sized molded article is to be produced by an injection molding method using a thermoplastic resin, the fluidity of the resin needs to be increased to ensure high transferability. Accordingly, a polycarbonate resin that is used to produce a complicated and thinned product not only needs to have the anti-mold fouling property as described above but also needs to have high fluidity. Although the polycarbonates described in Patent documents 2 and 3 have excellent fluidity, the amount of a low-molecular-weight carbonate compound contained in the polycarbonate resins is not mentioned at all and thus there is a risk that the anti-mold fouling property required for producing a complicated and thinned product may be insufficient.

Meanwhile, Patent documents 4 and 5 describe a method for reducing the amount of a low-molecular-weight carbonate compound in a polycarbonate resin. The method of Patent document 4, however, requires partial removal of the water phase after the reaction, and thus is cumbersome by having a number of steps. Since the method described in Patent document 5 requires addition of a quaternary ammonium salt at the end of phosgene blowing and addition of a molecular weight modifier, namely, a terminating agent, after polymerization of a predetermined molecular weight, there is a problem of difficulty in adjusting the timing for adding the molecular weight modifier, namely, the terminating agent.

With respect to the above-described problems associated with polycarbonate resins, the present inventors found this time that a polycarbonate resin which has a specific terminal structure and a specific viscosity-average molecular weight and in which the content of the low-molecular-weight carbonate compound is less than 1 mass % can give high fluidity and also reduced mold fouling such as mold deposits.

Moreover, with respect to the above-described problems associated with polycarbonate resins, the present inventors also found this time that a polycarbonate resin in which the amount of a low-molecular-weight carbonate compound having a molecular weight of 1,000 or less contained is less than 1 mass %, which has high fluidity and with which mold fouling such as mold deposits can be reduced can simply be produced by performing interfacial polymerization reaction using a terminating agent solution containing a terminating agent having a specific structure at a predetermined concentration. The present invention is based on these findings.

Thus, the present invention is characterized as follows.

[1] A polycarbonate resin having a terminal structure represented by general formula (1) below and having a viscosity-average molecular weight of 10,000-18,000, wherein the amount of a low-molecular-weight carbonate compound having a molecular weight of 1,000 or less contained in the polycarbonate resin is less than 1 mass %:

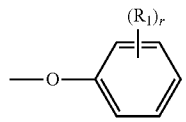

(1)

where, $R_1$ represents a halogen atom, a C5-14 alkyl group, a C1-23 alkyloxy group or a C2-23 alkyl ester group; and r represents an integer of 1-5.

[2] The polycarbonate resin according to [1], wherein the polycarbonate resin contains a structural unit represented by general formula (2) below:

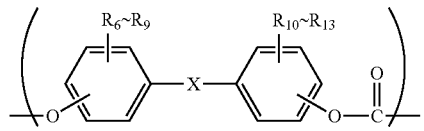

(2)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group;

the substituents are each independently halogen, a C1-20 alkyl group or a C6-12 aryl group; and X represents any structure selected from the group consisting of a single bond, —O—, —S—, —SO—, —SO—, —CO— and general formulae (3) to (6) below:

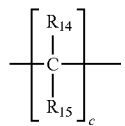

(3)

where, $R_{14}$ and $R_{15}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group;

the substituents are each independently halogen, a C1-20 alkyl group or a C6-12 aryl group; and c represents an integer of 1-20;

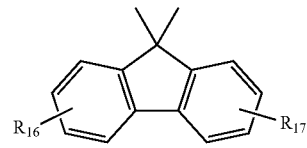

(4)

where, $R_{16}$ and $R_{17}$ each independently represent any one selected from the group consisting of hydrogen, halogen, an optionally substituted C1-20 alkyl group, an optionally substituted C1-S alkoxy group, an optionally substituted C6-12 aryl group, an optionally substituted C2-5 alkenyl group and an optionally substituted C7-17 aralkyl group, or $R_{16}$ and $R_{17}$ bind to each other to form a C1-20 carbocyclic ring or heterocyclic ring; and the substituents are each independently halogen, a C1-20 alkyl group or a C6-12 aryl group;

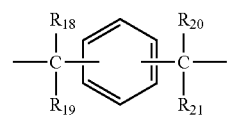

(5)

where, $R_{18}$-$R_{21}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{18}$ and $R_{19}$, and $R_{20}$ and $R_{21}$ respectively bind to each other to form a C1-20 carbocyclic ring or heterocyclic ring; and the substituents are each independently halogen, a C1-20 alkyl group or a C6-12 aryl group; and

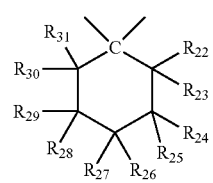

(6)

where, $R_{22}$-$R_{31}$ each independently represent a hydrogen atom or a C1-3 alkyl group.

[3] The polycarbonate resin according to [1] or [2], wherein X in general formula (2) has a structure represented by general formula (3).

[4] The polycarbonate resin according to any one of [1]-[3], wherein the structural unit represented by general formula (2) is a structural unit derived from 2,2-bis(4-hydroxyphenyl)propane.

[5] The polycarbonate resin according to any one of [1]-[4], wherein the terminal structure represented by general formula (1) has a structure represented by general formula (7), (8) or (9) below:

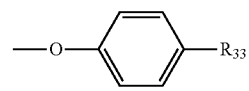

(7)

where, $R_{33}$ represents a C5-14 alkyl group;

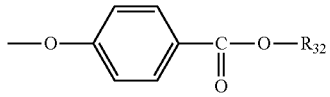
(8)

where, $R_{32}$ represents a C1-22 alkyl group; and

(9)

where, $R_{34}$ represents a C1-23 alkyl group.

[6] The polycarbonate resin according to [5], wherein $R_{33}$ in general formula (7) is one or more selected from the group consisting of a n-octyl group, an iso-octyl group, a t-octyl group and a dodecyl group.

[7] A method for producing a polycarbonate resin by interfacial polymerization reaction using a dihydric phenol and a terminating agent represented by general formula (1a) below:

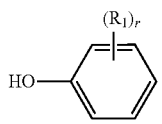
(1a)

where, $R_1$ represents a halogen atom, a C5-14 alkyl group, a C1-23 alkyloxy group or a C2-23 alkyl ester group; and
r represents an integer of 1-5,
the method comprising, for the interfacial polymerization reaction, a step of adding a terminating agent solution containing the terminating agent at a concentration of less than 10 mass % to a solution containing the dihydric phenol.

[8] The method according to [7], comprising a step of blowing phosgene into the solution containing the dihydric phenol prior to the step of adding the terminating agent solution.

[9] The method according to [7] or [8], wherein the terminating agent solution comprises a solvent selected from the group consisting of methylene chloride, tetrachloroethane, chloroform, 1,2-dichloroethylene, trichloroethane, dichloroethane, chlorobenzene, dichlorobenzene, chlorotoluene, acetophenone, cyclohexane and anisole.

[10] The method according to any one of [7]-[9], wherein the terminating agent solution comprises methylene chloride.

[11] The method according to any one of [7]-[10], wherein the dihydric phenol is a compound represented by general formula (2a) below:

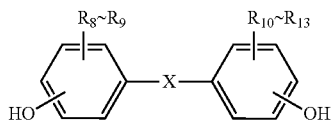
(2a)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group;
the substituents are each independently halogen, a C1-20 alkyl group or a C6-12 aryl group; and
X represents any structure selected from the group consisting of a single bond, —O—, —S—, —SO—, —SO$_2$—, —CO— and general formulae (3) to (6) below:

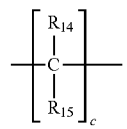
(3)

where, $R_{14}$ and $R_{15}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group;
the substituents are each independently halogen, a C1-20 alkyl group or a C6-12 aryl group; and
c represents an integer of 1-20;

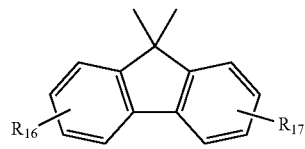
(4)

where, $R_{16}$ and $R_{17}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{16}$ and $R_{17}$ bind to each other to form a C1-20 carbocyclic ring or heterocyclic ring; and
the substituents are each independently halogen, a C1-20 alkyl group or a C6-12 aryl group;

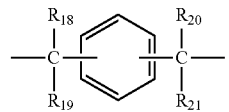
(5)

where, $R_{18}$-$R_{21}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{18}$ and $R_{19}$, and $R_{20}$ and $R_{21}$ respectively bind to each other to form a C1-20 carbocyclic ring or heterocyclic ring; and the substituents are each independently halogen, a C1-20 alkyl group or a C6-12 aryl group; and

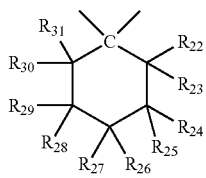
(6)

where, $R_{22}$-$R_{31}$ each independently represent a hydrogen atom or a C1-3 alkyl group.

[12] The method according to [11], wherein X in general formula (2a) has the structure represented by general formula (3).

[13] The method according to [11] or [12], wherein the compound represented by general formula (2a) is 2,2-bis(4-hydroxyphenyl)propane.

[14] The method according to any one of [7]-[13], wherein the terminating agent is a compound represented by general formula (7a), (8a) or (9a) below:

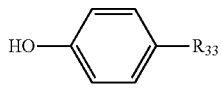
(7a)

where, $R_{33}$ represents a C5-14 alkyl group;

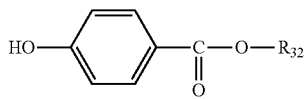
(8a)

where, $R_{32}$ represents a C1-22 alkyl group; and

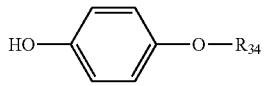
(9a)

where, $R_{34}$ represents a C1-23 alkyl group.

[15] The method according to [14], wherein the terminating agent is a compound represented by general formula (7a).

[16] The method according to [15], wherein $R_{33}$ in general formula (7a) is one or more selected from the group consisting of a n-octyl group, an iso-octyl group, a t-octyl group and a dodecyl group.

[17] The method according to any one of [7]-[16], wherein the viscosity-average molecular weight of the polycarbonate resin is 10,000-18,000.

[18] The method according to any one of [7]-[17], wherein the amount of a low-molecular-weight carbonate compound having a molecular weight of 1,000 or less contained in the polycarbonate resin is less than 1 mass %.

Effects of Invention

A polycarbonate resin of the present invention has high fluidity and is also capable of reducing mold fouling such as mold deposits. In addition, according to a method for producing a polycarbonate resin of the present invention, a polycarbonate resin in which the amount of a low-molecular-weight carbonate compound having a molecular weight of 1,000 or less contained is less than 1 mass %, which has high fluidity, and with which mold fouling such as mold deposits can be reduced can be produced in a simple manner.

MODE FOR CARRYING OUT INVENTION

Next, one exemplary embodiment of the present invention will be described, although the present invention should not be limited to the following embodiment.

<First Aspect>

A first aspect comprises, for example, the following invention.

A polycarbonate resin having a terminal structure represented by general formula (1) below and having a viscosity-average molecular weight of 10,000-18,000, wherein the amount of a low-molecular-weight carbonate compound having a molecular weight of 1,000 or less contained in the polycarbonate resin is less than 1 mass %:

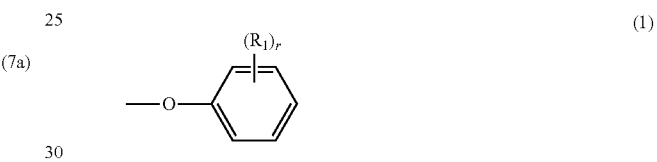
(1)

where, $R_1$ represents a halogen atom, a C5-14 alkyl group, a C1-23 alkyloxy group or a C2-23 alkyl ester group; and r represents an integer of 1-5.

Hereinafter, the above-mentioned invention will be described in detail.

[Polycarbonate Resin]

A polycarbonate resin of the present invention has a terminal structure represented by general formula (1) below, and has a viscosity-average molecular weight of 10,000-18,000. Moreover, the polycarbonate resin of the present invention is characterized in that the amount of a low-molecular-weight carbonate compound having a molecular weight of 1,000 or less contained in the polycarbonate resin is less than 1 mass %:

(1)

where, $R_1$ represents a halogen atom, a C5-14 alkyl group, a C1-23 alkyloxy group or a C2-23 alkyl ester group; and r represents an integer of 1-5.

In a preferable aspect, the terminal structure represented by general formula (1) above has a structure represented by general formula (7), (8) or (9) below:

(7)

where, $R_{33}$ represents a C5-14 alkyl group;

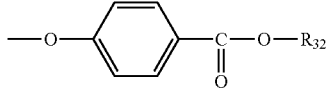
(8)

where, $R_{32}$ represents a C1-22 alkyl group; and

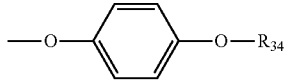
(9)

where, $R_{34}$ represents a C1-23 alkyl group.

In a more preferable aspect, $R_{32}$, $R_{33}$ and $R_{34}$ in general formulae (7), (8) and (9), respectively, each represent one or more selected from the group consisting of a n-octyl group, an iso-octyl group, a t-octyl group and a dodecyl group.

Although the structural unit of the polycarbonate resin of the present invention is not particularly limited, it preferably comprises a structural unit represented by general formula (2) below.

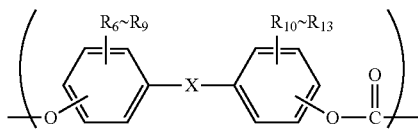
(2)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group; the substituents are each independently halogen, a C1-20 alkyl group or a C6-12 aryl group; and X represents any structure selected from the group consisting of a single bond, —O—, —S—, —SO—, —SO$_2$—, —CO— and general formulae (3) to (6) below. Preferably, X has the structure represented by general formula (3) below:

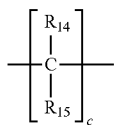
(3)

where, $R_{14}$ and $R_{15}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group; the substituents are each independently halogen, a C1-20 alkyl group or a C6-12 aryl group; and c represents an integer of 1-20;

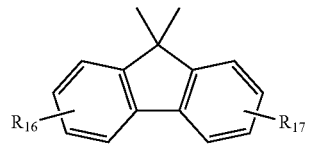
(4)

where, $R_{16}$ and $R_{17}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{16}$ and $R_{17}$ bind to each other to form a C1-20 carbocyclic ring or heterocyclic ring; and the substituents are each independently halogen, a C1-20 alkyl group or a C6-12 aryl group;

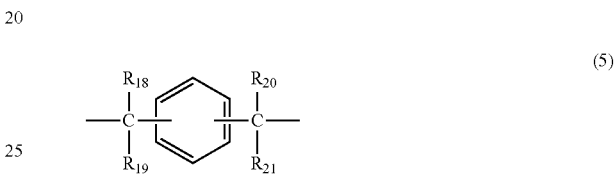
(5)

where, $R_{18}$-$R_{21}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{18}$ and $R_{19}$, and $R_{20}$ and $R_{21}$ respectively bind to each other to form a C1-20 carbocyclic ring or heterocyclic ring; and the substituents are each independently halogen, a C1-20 alkyl group or a C6-12 aryl group; and

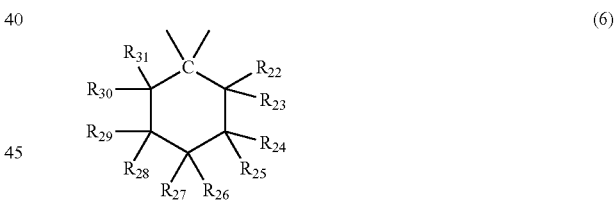
(6)

where, $R_{22}$-$R_{31}$ each independently represent a hydrogen atom or a C1-3 alkyl group.

The amount of a low-molecular-weight carbonate compound having a molecular weight of 1,000 or less contained in the polycarbonate resin of the present invention is less than 1 mass %. The low-molecular-weight carbonate compound with a molecular weight of 1,000 or less comprises, for example, a dicarbonate compound which is a condensation reaction product between dichloroformate of a dihydric phenol generated by phosgenation reaction of the dihydric phenol and a terminating agent.

When a polycarbonate resin that contains a large amount of a low-molecular-weight carbonate compound with a molecular weight of 1,000 or less is used for continuous injection molding or the like to produce discs or complicated and thinned products, it is likely to generate a minute amount of adhering matters (mold deposits) at a relatively early stage, that cause contamination of the mold. In this regard, contamination of the mold can effectively be prevented if the amount of a low-molecular-weight carbonate compound having a molecular weight of 1,000 or less is less than 1 mass %. Furthermore, the lower limit amount of a low-molecular-weight carbonate compound having a molecular weight of 1,000 or less contained in the polycarbonate resin is preferably around 0.01 mass % due to a trade-off regarding purification cost.

The polycarbonate resin of the present invention can be obtained through polymerization with a dihydric phenol and a carbonate ester forming compound, followed by termination of the reaction with a terminating agent. Each of the materials will be described hereinbelow.

<Dihydric Phenol>

Although a dihydric phenol used for producing a polycarbonate resin of the present invention is not particularly limited as long as it is a phenol-based compound that has two hydroxyl groups in a molecule, it is preferably a dihydric phenol represented by general formula (2a) below in terms of impact resistance of the resulting molded article, high purity, and substantial availability. By using such a dihydric phenol, the resulting polycarbonate resin will have the structural unit represented by general formula (2).

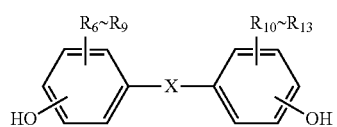

(2a)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group; the substituents are each independently halogen, a C1-20 alkyl group or a C6-12 aryl group; and X represents any structure selected from the group consisting of a single bond, —O—, —S—, —SO—, —SO$_2$—, —CO— and general formulae (3) to (6) above. Preferably, X has a structure represented by general formula (3) above).

Example of the dihydric phenol represented by general formula (2a) include 2,2-bis(4-hydroxyphenyl)propane (BPA), 1,1-bis(4-hydroxyphenyl)ethane, bis(4-hydroxyphenyl)methane, bis(4-hydroxyphenyl)-p-diisopropylbenzene, 4,4'-dihydroxydiphenyl, 2,2-bis(4-hydroxy-3,5-dimethylphenyl)propane, 2,2-bis(4-hydroxy-3-methylphenyl)propane, 2,2-bis(4-hydroxy-3,5-diethylphenyl)propane, 2,2-bis(4-hydroxy-3-ethylphenyl)propane, 2,2-bis(4-hydroxy-3,5-diphenylphenyl)propane, 2,2-bis(4-hydroxy-3-phenylphenyl)propane, 2,2-bis(4-hydroxy-3,5-dibromophenyl)propane, 2,2-bis(4-hydroxy-3-bromophenyl)propane, 2,2-bis(4-hydroxyphenyl)pentane, 2,4'-dihydroxy-diphenylmethane, bis(4-hydroxy-3-methylphenyl)methane, bis(4-hydroxy-3-nitrophenyl)methane, 1,1-bis(4-hydroxyphenyl)ethane, 1,1-bis(4-hydroxy-3-methylphenyl)ethane, 3,3-bis(4-hydroxyphenyl)pentane, 1,1-bis(4-hydroxyphenyl)cyclohexane [=bisphenol Z], bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dimethyldiphenyl ether, 4,4'-dihydroxy-2,5-diethoxydiphenyl ether, 1-phenyl-1,1-bis(4-hydroxyphenyl)ethane, 1,1-bis(4-hydroxy-3-methylphenyl)cyclohexane, 1-phenyl-1,1-bis(4-hydroxy-3-methylphenyl) ethane, bis(4-hydroxyphenyl)diphenylmethane, bis(4-hydroxy-3-methylphenyl)diphenylmethane, 9,9-bis(4-hydroxyphenyl)fluorene, 9,9-bis(4-hydroxy-3-methylphenyl)fluorene and 2,2-bis(4-hydroxyphenyl) hexafluoropropane. Among them, 2,2-bis(4-hydroxyphenyl) propane (BPA), 1,1-bis(4-hydroxyphenyl)ethane and bis(4-hydroxyphenyl)methane are more preferable, and 2,2-bis(4-hydroxyphenyl)propane (BPA) is particularly preferable in terms of stability as a monomer and availability of those with less impurity content.

Moreover, the polycarbonate resin of the present invention may have a branched structure if necessary. In order to obtain a branched polycarbonate resin, a polyhydroxy compound as typified by phloroglucine, 4,6-dimethyl-2,4,6-tris (4-hydroxyphenyl)heptene-2, 4,6-dimethyl-2,4,6-tris(4-hydroxyphenyl)heptane, 2,6-dimethyl-2,4,6-tris(4-hydroxyphenyl)heptene-3, 1,3,5-tris(4-hydroxyphenyl)benzene, 1,1,1-tris(4-hydroxyphenyl)ethane or the like, or a polyfunctional compound as typified by 3,3-bis(4-hydroxyaryl)oxindole (=isatin bisphenol), 5-chloroisatin bisphenol, 5,7-dichloroisatin bisphenol, 5-bromoisatin bisphenol or the like can be substituted for a part of the above-described dihydric phenol.

<Carbonate Ester Forming Compound>

Examples of the carbonate ester forming compound used for producing a polycarbonate resin of the present invention include phosgene, triphosgene, carbonate diester and a carbonyl compound. Among the carbonate ester forming compounds, phosgene is particularly preferable in terms of quality such as hue and stability of the resulting resin and also in terms of cost.

Examples of the carbonyl compound include carbon monoxide and carbon dioxide.

Examples of carbonate diester include dialkyl carbonate compounds such as dimethyl carbonate, diethyl carbonate and di-tert-butyl carbonate, and diaryl carbonate compounds such as diphenyl carbonate, di-p-tolyl carbonate, phenyl-p-tolyl carbonate and di-p-chlorophenyl carbonate. Among them, diphenyl carbonate or a substituted diphenyl carbonate such as di-p-tolyl carbonate, phenyl-p-tolyl carbonate and di-p-chlorophenyl carbonate is preferable in terms of reactivity, hue of the resulting resin as well as cost, where diphenyl carbonate is particularly preferable. These carbonate diester compounds may be used alone or two or more of them can be used as a mixture.

<Terminating Agent>

The terminating agent used for producing the polycarbonate resin of the present invention is a monohydric phenol represented by general formula (1a) below.

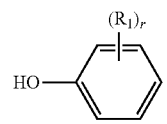

(1a)

In general formula (1a), $R_1$ represents a halogen atom, a C5-14 alkyl group, a C1-23 alkyloxy group or a C2-23 alkyl ester group; and r represents an integer of 1-5.

As specific examples of the terminating agent represented by general formula (1a), any one or more of: alkyl phenols such as pentyl phenol, hexyl phenol, heptyl phenol, n-octyl phenol, iso-octyl phenol, t-octyl phenol, nonyl phenol, decyl phenol, dodecyl phenol and tetradecyl phenol; hydroxybenzoate esters such as hydroxybenzoate 2-ethylhexyl ester, hydroxybenzoate 2-hexyldecyl ester, hydroxybenzoate hexadecyl ester and hydroxybenzoate docosyl ester, and alkoxy phenols such as ethoxy phenol, hexyloxy phenol, n-octyloxy phenol, iso-octyloxy phenol, t-octyloxy phenol, dodecyloxy phenol and docosyloxy phenol can be used as the terminating agent.

More preferably, the terminating agent represented by general formula (1a) is one that is represented by general formula (7a), (8a) or (9a):

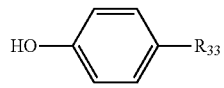
(7a)

where, $R_{33}$ represents a C5-14 alkyl group;

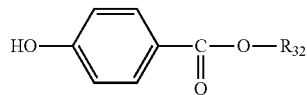
(8a)

where, $R_{32}$ represents a C1-22 alkyl group; and

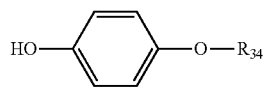
(9a)

where, $R_{34}$ represents a C1-23 alkyl group.

As specific examples of the terminating agent represented by general formula (7a), (8a) or (9a), any one or more of: alkyl phenols such as para-pentyl phenol, para-hexyl phenol, para-heptyl phenol, para-n-octyl phenol, para-iso-octyl phenol, para-t-octyl phenol, para-nonyl phenol, para-decyl phenol, para-dodecyl phenol and para-tetradecyl phenol; hydroxybenzoate esters such as para-hydroxybenzoate 2-ethylhexyl ester, para-hydroxybenzoate 2-hexyldecyl ester, para-hydroxybenzoate hexadecyl ester and para-hydroxybenzoate docosyl ester, and alkoxy phenols such as para-ethoxy phenol, para-hexyloxy phenol, para-n-octyloxy phenol, para-iso-octyloxy phenol, para-t-octyloxy phenol, para-dodecyloxy phenol and para-docosyloxy phenol are preferably used as the terminating agent in terms of fluidity, and strength and heat resistance of the molded article.

More preferably, any one or more of para-t-octyl phenol, para-hydroxybenzoate 2-ethylhexyl ester and para-n-octyloxy phenol are used as the terminating agent in terms of availability in addition to fluidity, and strength and heat resistance of the molded article.

Depending on the production conditions of the polycarbonate resin of the present invention, a terminal group remaining as a phenolic OH group that does not react with the terminating agent might be formed. The number of phenolic OH groups is preferably as few as possible in terms of hydrolysis resistance. Specifically, preferably 80 mol % or more of the whole terminal is blocked with the structure represented by general formula (1), and more preferably 90 mol % or more of the whole terminal is blocked with the structure represented by general formula (1).

Depending on the required characteristics of the material, two or more types of terminating agents can be used in combination as the terminating agent used for the present invention without departing from the intention of the present invention, and a structure other than the structure represented by general formula (1a) is allowed to be used in combination. Examples of the terminating agent that can be used in combination include alkyl phenols such as phenol, p-cresol, o-cresol, 2,4-xylenol, p-t-butyl phenol, o-allyl phenol, p-allyl phenol, p-hydroxystyrene, p-hydroxy-α-methylstyrene, p-propyl phenol, p-cumyl phenol, p-phenyl phenol, o-phenyl phenol, p-trifluoromethyl phenol, eugenol, palmityl phenol, stearyl phenol and behenyl phenol; and para-hydroxybenzoate alkyl esters such as methyl ester, ethyl ester, propyl ester, butyl ester, amyl ester, hexyl ester and heptyl ester of para-hydroxybenzoate. Also, two or more types of the above-mentioned terminating agents can be used in combination. A terminating agent that can particularly be used in combination is p-t-butyl phenol in terms of purity and cost.

When other terminating agent is to be used, it is preferably 20 mol % or less and more preferably 10 mol % or less of the whole terminating agent.

<Amount of Terminating Agent (Monohydric Phenol) Used>

The molecular weight of the polycarbonate resin of the present invention is controlled by the amount of the terminating agent used. The polymerization degree of the dihydric phenol used for the main skeleton and the amount of the terminating agent used can be expressed in Numerical formula (I) below.

Amount of terminating agent used (mol)=Amount of dihydric phenol used (mol)/Polymerization degree of main skeleton×2 (I)

While the amounts of the terminating agent (monohydric phenol) and the dihydric phenol used can be determined based on this formula, (Amount of dihydric phenol used (mol)):(Amount of terminating agent used (mol)) is in a range of preferably 50:1-4:1, more preferably 40:1-4:1, still more preferably 23:1-4:1, yet more preferably 20:1-6:1, yet still more preferably 16:1-6:1 and particularly preferably 15:1-8:1.

Depending on the required characteristics of the material, the polycarbonate resin of the present invention can be mixed with other resin or various additives without departing from the intention of the present invention.

[Other Resin that can be Mixed]

If necessary, the polycarbonate resin of the present invention may contain other resin. Examples of such other resin include: thermoplastic polyester resins such as a polycarbonate resin other than the polycarbonate resin used with the present invention, a polyethylene terephthalate resin (PET resin), a polytrimethylene terephthalate (PTT resin) and a polybutylene terephthalate resin (PBT resin); styrene-based resins such as a polystyrene resin (PS resin), a high impact polystyrene resin (HIPS), an acrylonitrile-styrene copolymer (AS resin) and a methyl methacrylate-styrene copolymer (MS resin); elastomers such as a core-shell type elastomer like a methyl methacrylate-acrylic rubber-styrene copolymer (MAS) and a polyester-based elastomer, polyolefin resins such as a cyclic cycloolefin resin (COP resin) and a cyclic cycloolefin (COP) copolymer resin; a polyamide resin (PA resin); a polyimide resin (PI resin); a polyetherimide resin (PEI resin); a polyurethane resin (PU resin); a polyphenylene ether resin (PPE resin); a polyphenylene sulfide resin (PPS resin); a polysulfone resin (PSU resin); a polymethacrylate resin (PMMA resin); and polycaprolactone. Examples of a particularly preferable resin to be mixed with include a PS resin, an AS resin and a PMMA resin.

The component proportion of the other resin in the polycarbonate resin of the present invention is preferably 10 mass % or less and more preferably 1 mass % or less of the whole resin component. The component proportion of the other resin is kept to stay 10 mass % or less so that various physical properties can be maintained.

[Additives]

The polycarbonate resin of the present invention may be blended with various additives without departing from the intention of the present invention. Such additive may be, for example, at least one additive selected from the group consisting of a heat stabilizer, an antioxidant, a flame retardant, a flame-retardant auxiliary, an ultraviolet absorber, a mold release agent and a colorant.

In addition, an antistatic agent, a fluorescent whitening agent, an antifogging agent, a fluidity improving agent, a plasticizer, a dispersant, an antibacterial agent or the like may be added as long as various physical properties desired are not significantly impaired.

Examples of the heat stabilizer include phenol-based, phosphorus-based and sulfur-based heat stabilizers. Specific examples include oxoacids of phosphorus such as phosphoric acid, phosphonic acid, phosphorous acid, phosphinic acid and polyphosphoric acid; acid pyrophosphate metal salts such as sodium acid pyrophosphate, potassium acid pyrophosphate and calcium acid pyrophosphate; phosphates of Group 1 or 10 metals such as potassium phosphate, sodium phosphate, cesium phosphate and zinc phosphate; and an organic phosphate compound, an organic phosphite compound and an organic phosphonite compound. Alternatively, examples further include at least one selected from the group consisting of (a) phosphite ester compounds, where at least one ester in the molecule is esterified with phenol and/or phenol having at least one C1-25 alkyl group (b) phosphorous acid and (c) tetrakis(2,4-di-tert-butylphenyl)-4,4'-biphenylene-di-phosphonite. Specific examples of the phosphite ester compound (a) include trioctyl phosphite, trioctadecyl phosphite, tridecyl phosphite, trilauryl phosphite, tristearyl phosphite, triphenyl phosphite, tris(mononoylphenyl)phosphite, tris(mono/di-nonylphenyl)phosphite, trisnonylphenyl phosphite, tris(octylphenyl)phosphite, tris(2,4-di-tert-butylphenyl)phosphite, trinonyl phosphite, didecyl monophenyl phosphite, dioctyl monophenyl phosphite, diisopropyl monophenyl phosphite, monobutyldiphenyl phosphite, monodecyldiphenyl phosphite, bis(2,4-di-tert-butylphenyl)pentaerythritol phosphite, bis(2,6-di-tert-butyl-4-methylphenyl)pentaerythritol phosphite, monooctyldiphenyl phosphite, distearylpentaerythritol diphosphite, tricyclohexyl phosphite, diphenylpentaerythritol diphosphite, bis(2,6-di-tert-butyl-4-methylphenyl)pentaerythritol diphosphite, 2,2-methyienebis(4,6-di-tert-butylphenyl)octyl phosphite, bis(nonylphenyl)pentaerythritol diphosphite, bis (2,4-di-tert-butylphenyl)pentaerythritol diphosphite, and bis (2,6-di-tert-butyl-4-ethylphenyl)pentaerythritol diphosphite. These may be used alone or two or more types of them may be used as a mixture.

Specific examples of the organic phosphite compound include "ADK STAB 1178", "ADK STAB 2112", "ADK STAB HP-10" and "ADK STAB PEP-36" (trade names, likewise hereinbelow) from ADEKA, "JP-351", "JP-360" and "JP-3CP" from Johoku Chemical, and "IRGAFOS 168" from BASF.

Furthermore, examples of the phosphoric acid-based stabilizer include trimethyl phosphate, triethyl phosphate, tributyl phosphate, trioctyl phosphate, triphenyl phosphate, tricresyl phosphate, tris(nonylphenyl)phosphate and 2-ethylphenyldiphenyl phosphate. Here, one type of phosphorus-based stabilizer may be contained or two or more types of phosphorus-based stabilizers may be contained in any combination at any ratio.

The proportion of the heat stabilizer added, if any, is, for example, 0.001 parts by mass or more, preferably 0.01 parts by mass or more and more preferably 0.03 parts by mass or more while 1 parts by mass or less, preferably 0.7 parts by mass or less and more preferably 0.5 parts by mass or less, with respect to 100 parts by mass of the polycarbonate resin. If the amount of the heat stabilizer is too small, the heat stabilizing effect may be insufficient whereas if the amount of the heat stabilizer is too large, the effect may level off and thus be uneconomical.

Examples of the antioxidant include a phenol-based antioxidant, a hindered phenol-based antioxidant, a bisphenol-based antioxidant and a polyphenol-based antioxidant. Specific examples include 2,6-di-tert-butyl-4-methyl phenol, tris(3,5-di-tert-butyl-4-hydroxybenzyl)isocyanurate, n-octadecyl-3-(3',5'-di-tert-butyl-4'-hydroxyphenyl)propionate, tetrakis[methylene-3-(3,5-di-tert-butyl-4-hydroxyphenyl) propionate]methane, 4,4'-butylidenebis(3-methyl-6-tert-butyl phenol), triethylene glycol-bis[3-(3-tert-butyl-4-hydroxy-5-methylphenyl)propionate], 3,9-bis {2-[3-(3-tert-butyl-4-hydroxy-5-methylphenyl)propionyloxy]-1,1-dimethylethyl}-2, 4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], N,N'-hexane-1,6-diyl bis[3-(3, 5-di-tert-butyl-4-hydroxyphenyl propionamide), 2,4-dimethyl-6-(1-methylpentadecyl)phenol, diethyl[[3,5-bis(1, 1-dimethylethyl)-4-hydroxyphenyl]methyl]phosphate, 3,3', 3",5,5',5"-hexa-tert-butyl-a,a',a"-(mesitylene-2,4,6-triyl)tri-p-cresol, 4,6-bis(octylthiomethyl)-o-cresol, ethylenebis (oxyethylene)bis[3-(5-tert-butyl-4-hydroxy-m-tolyl) propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6 (1H,3H,5H)-trione and 2,6-di-tert-butyl-4-(4,6-bis(octylthio)-1,3,5-triazine-2-ylamino)phenol. Specific examples of the phenol-based antioxidant include "IRGANOX 1010" and "IRGANOX 1076" (trade names, likewise hereinbelow) from BASF, and "ADK STAB AO-50" and "ADK STAB AO-60" from ADEKA. Here, one type of phenol-based stabilizer may be contained or two or more types of phenol-based stabilizers may be contained in any combination at any ratio.

The proportion of the antioxidant added, if any, is, for example, 0.001 parts by mass or more and preferably 0.01 parts by mass or more while 1 parts by mass or less and preferably 0.5 parts by mass or less, with respect to 100 parts by mass of the polycarbonate resin. If the amount of the antioxidant is too small, the antioxidant effect may be insufficient whereas if the amount of the antioxidant is too large, the effect may level off and thus be uneconomical.

Examples of the flame retardant include organic sulfonic acid metal salts. Examples of the organic sulfonic acid metal salt include aliphatic sulfonic acid metal salts and aromatic sulfonic acid metal salts, which may be used alone or two or more of them can be used in combination. Preferable metal salts are alkali metal salts and alkaline earth metal salts. Examples of the alkali metal include sodium, lithium, potassium, rubidium and cesium. Examples of the alkaline earth metal include calcium and strontium. The metal of the organic sulfonic acid metal salt used with the present invention is preferably alkali metals such as sodium, potassium, rubidium and cesium, and more preferably sodium and potassium. By employing such metal, formation of a carbonized layer upon burning can effectively be promoted and an effect of maintaining high transparency can be acquired.

Examples of the aliphatic sulfonic acid metal salt preferably include fluoroalkane-sulfonic acid metal salts, and more preferably include perfluoroalkane-sulfonic acid metal salts.

Furthermore, examples of the fluoroalkane-sulfonic acid metal salt include alkali metal salts and alkaline earth metal salts, among which alkali metal salts are preferable. The carbon number of the fluoroalkane-sulfonic acid metal salt is preferably 1-8 and more preferably 2-4. Within such a range, an effect of maintaining high transparency can be achieved. Preferable examples of fluoroalkane-sulfonic acid metal salts include sodium perfluorobutane-sulfonate, potassium perfluorobutane-sulfonate, sodium perfluoroethane-sulfonate and potassium perfluoroethane-sulfonate.

Examples of the aromatic sulfonic acid metal salt include alkali metal salts and alkaline earth metal salts, where alkali metal salts are preferable. Specific examples of alkali metal salts of aromatic sulfonate include sodium 3,4-dichlorobenzene sulfonate, sodium 2,4,5-trichlorobenzene sulfonate, sodium benzene sulfonate, sodium diphenylsulfone-3-sulfonate, potassium diphenylsulfone-3-sulfonate, sodium 4,4'-dibromodiphenyl-sulfone-3-sulfonate, potassium 4,4'-dibromophenyl-sulfone-3-sulfonate, disodium diphenylsulfone-3,3'-disulfonate, dipotassium diphenylsulfone-3,3'-disulfonate, sodium dodecylbenzene sulfonate, potassium dodecylbenzene sulfonate, potassium p-toluenesulfonate and potassium p-styrenesulfonate.

The organic sulfonic acid metal salt that can be used for the polycarbonate resin of the present invention is preferably potassium diphenylsulfone-3-sulfonate, potassium p-toluenesulfonate, potassium p-styrenesulfonate and potassium dodecylbenzene sulfonate, and more preferably potassium diphenylsulfone-3-sulfonate, particularly in terms of enhancing the transparency of the molded article. Here, the amount of the organic sulfonic acid metal salt added with respect to 100 parts by mass of the polycarbonate resin is 0.005-0.1 parts by mass, preferably 0.01-0.1 parts by mass, and more preferably 0.03-0.09 parts by mass. According to the present invention, a flame retardant other than organic sulfonic acid metal salts may be blended.

As a flame-retardant auxiliary, for example, a silicone compound can be added. As the silicone compound, one that has a phenyl group in the molecule is preferable. By having a phenyl group, dispersibility of the silicone compound in the polycarbonate can be enhanced, giving excellent transparency and flame retardance. A mass-average molecular weight of the silicone compound is preferably 450-5,000, more preferably 750-4,000, still more preferably 1,000-3,000 and particularly preferably 1,500-2,500. By making the mass-average molecular weight to be 450 or more, production as well as application to industrial production can be facilitated, and heat resistance of the silicone compound is less likely to be deteriorated. Meanwhile, by making the mass-average molecular weight of the silicone compound to be 5,000 or less, dispersibility in the polycarbonate resin is less likely to be deteriorated as a result of which deterioration of flame retardance and mechanical properties of the molded article are likely to be prevented more effectively.

The proportion of the flame-retardant auxiliary added, if any, is, for example, 0.1 parts by mass or more and preferably 0.2 parts by mass or more while 7.5 parts by mass or less and preferably 5 parts by mass or less, with respect to 100 parts by mass of the polycarbonate resin. If the proportion of the flame-retardant auxiliary added is too small, flame retardance may be insufficient whereas if the proportion of the flame-retardant auxiliary added is too large, appearance defects such as delamination may occur, transparency may be deteriorated, and the effect may level off and thus be uneconomical.

Examples of the ultraviolet absorber include inorganic ultraviolet absorbers such as cerium oxide and zinc oxide, and organic ultraviolet absorbers such as a benzotriazole compound, a benzophenone compound, a salicylate compound, a cyanoacrylate compound, a triazine compound, an oxanilide compound, a malonic ester compound, a hindered amine compound and a phenyl salicylate-based compound. Among them, benzotriazole- or benzophenone-based organic ultraviolet absorbers are preferable. In particular, specific examples of the benzotriazole compound include 2-(2'-hydroxy-5'-methylphenyl)benzotriazole, 2-[2'-hydroxy-3',5'-bis(a,a-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl)benzotriazole, 2,2'-methylenebis[4-(1,1,3,3-tetramethylbutyl)-6-(2N-benzotriazole-2-yl)phenol], 2-(4,6-diphenyl-1,3,5-triazine-2-yl)-5-[(hexyl)oxy]-phenol, 2-[4,6-bis(2,4-dimethylphenyl)-1,3,5-triazine-2-yl]-5-(oxtyloxy)phenol, 2,2'-(1,4-phenylene)bis[4H-3,1-benzoxazine-4-one], [(4-methoxyphenyl)-methylene]-propanedioic acid-dimethyl ester, 2-(2H-benzotriazole-2-yl)-p-cresol, 2-(2H-benzotriazole-2-yl)-4,6-bis(1-methyl-1-phenylmethyl)phenol, 2-[5-chloro (2H)-benzotriazole-2-yl]-4-methyl-6-(tert-butyl)phenol, 2,4-di-tert-butyl-6-(5-chlorobenzotriazole-2-yl)phenol, 2-(2H-benzotriazole-2-yl)-4-(1,1,3,3-tetrabutyl)phenol, 2,2'-methylenebis[6-(2H-benzotriazole-2-yl)-4-(1,1,3,3-tetrabutyl)phenol], and [methyl-3-[3-tert-butyl-5-(2H-benzotriazole-2-yl)-4-hydroxyphenyl]propionate-polyethylene glycol] condensates. Two or more of them may be used in combination. Among them, 2-(2'-hydroxy-5'-tert-octylphenyl)benzotriazole, and 2,2'-methylene-bis[4-(1,1,3,3-tetramethylbutyl)-6-(2N-benzotriazole2-yl)phenol] are preferable. In addition, specific examples of the benzophenone-based ultraviolet absorber include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-dihydroxy-4-methoxy-benzophenone, 2,2'-dihydroxy-4,4'-dimethoxy-benzophenone and 2,2',4,4'-tetrahydroxy-benzophenone. Specific examples of the phenyl salicylate-based ultraviolet absorber include phenyl salicylate and 4-tert-butyl-phenyl salicylate. Specific examples of the triazine-based ultraviolet absorber include 2-(4,6-diphenyl-1,3,5-triazine-2-yl)-5-[(hexyl)oxy]-phenol and 2-[4,6-bis(2,4-dimethylphenyl)-1,3,5-triazine-2-yl]-5-(oxtyloxy)phenol. A specific example of the hindered amine-based ultraviolet absorber includes bis(2,2,6,6-tetramethylpiperidine-4-yl)sebacate.

The proportion of the ultraviolet absorber added, if any, is, for example, 0.01 parts by mass or more and preferably 0.1 parts by mass or more while 3 parts by mass or less and preferably 1 parts by mass or less, with respect to 100 parts by mass of the polycarbonate resin. If the proportion of the ultraviolet absorber added is too small, the effect of improving weatherability may be insufficient whereas if the proportion of the ultraviolet absorber added is too large, mold deposits or the like may be generated in the molded article to cause mold contamination upon molding.

Examples of the mold release agent include mold release agents such as carboxyl acid ester, a polysiloxane compound and paraffin wax (polyolefin-based). Specifically, examples include at least one compound selected from the group consisting of aliphatic carboxylic acid, ester of aliphatic carboxylic acid and alcohol, an aliphatic hydrocarbon compound with a number-average molecular weight of 200-15,000 and polysiloxane-based silicone oil. Examples of aliphatic carboxylic acid include saturated or unsaturated aliphatic mono-, di- or tri-carboxylic acids. Herein, the aliphatic carboxylic acid also comprises alicyclic carboxylic acids. Among them, the aliphatic carboxylic acid is preferably C6-36 mono- or di-carboxylic acid, and more preferably C6-36 aliphatic saturated monocarboxylic acid. Specific examples of aliphatic carboxylic acid include palmitic acid, stearic acid, valeric acid, caproic acid, caprylic acid, lauric acid, arachidic acid, behenic acid, lignoceric acid, cerotic acid, melissic acid, tetratriacontanoic acid, montanic acid, glutaric acid, adipic acid and azelaic acid. As the aliphatic carboxylic acid of the ester of aliphatic carboxylic acid and alcohol, those mentioned as the aliphatic carboxylic acid above can be used. Meanwhile, examples of alcohol include saturated or unsaturated mono- or poly-hydric alcohols. These alcohols may have a substituent such as a fluorine atom or an aryl group. Among them, a saturated mono- or poly-hydric alcohol with a carbon number of 30 or less is preferable, and an aliphatic saturated mono- or poly-hydric alcohol with a carbon number of 30 or less is more preferable. Herein, the aliphatic compound also comprises alicyclic compounds. Specific examples of alcohol include octanol, decanol, dodecanol, stearyl alcohol, behenyl alcohol, ethylene glycol, diethylene glycol, glycerol, pentaerythritol, 2,2-dihydroxyperfluoropropanol, neopentylene glycol, ditrimethylolpropane and dipentaerythritol. Here, the above-mentioned ester compound may contain aliphatic carboxylic acid and/or alcohol as impurities, and may be a mixture of multiple compounds. Specific examples of the ester of aliphatic carboxylic acid and alcohol include beeswax (mixture containing myricyl palmitate as the main component), stearyl stearate, behenyl behenate, stearyl behenate, glycerol monopalmitate, glycerol monostearate, glycerol distearate, glycerol tristearate, pentaerythritol monopalmitate, pentaerythritol monostearate, pentaerythritol distearate, pentaerythritol tristearate and pentaerythritol tetrastearate. Examples of the aliphatic hydrocarbon with a number-average molecular weight of 200-15,000 include liquid paraffin, paraffin wax, microwax, polyethylene wax, Fischer-Tropsch wax and C3-12 α-olefin oligomers. Here, the aliphatic hydrocarbon comprises an alicyclic hydrocarbon. Moreover, these hydrocarbon compounds may partially be oxidized. Among them, paraffin wax, polyethylene wax and a partial oxide of polyethylene wax are preferable, and paraffin wax and polyethylene wax are more preferable. The number-average molecular weight is preferably 200-5,000. These aliphatic hydrocarbons may be a single substance or a mixture of substances with various structural components and molecular weights as long as the main component is within the above-mentioned range. Examples of the polysiloxane-based silicone oil include dimethyl silicone oil, phenylmethyl silicone oil, diphenyl silicone oil and fluorinated alkyl silicone. Two or more types of them may be used in combination.

The proportion of the mold release agent added, if any, is preferably 0.001 parts by mass or more and more preferably 0.01 parts by mass or more while 2 parts by mass or less and more preferably 1 parts by mass or less, with respect to 100 parts by mass of the polycarbonate resin. If the proportion of the mold release agent added is too small, the effect of mold releasability upon molding may be insufficient, whereas if the proportion of the mold release agent added is too large, hydrolysis resistance of the molded article may be deteriorated and mold contamination and else may be caused upon injection molding.

Examples of the dye/pigment as the colorant include inorganic pigments, organic pigments and organic dyes. Examples of the inorganic pigments include: sulfide-based pigments such as carbon black, cadmium red and cadmium yellow; silicate-based pigments such as ultramarine; oxide-based pigments such as titanium oxide, zinc oxide, Bengal red, chromium oxide, black iron oxide, titanium yellow, zinc-iron-based brown, titanium cobalt-based green, cobalt green, cobalt blue, copper-chromium-based black and copper-iron-based black; chromic acid-based pigments such as chrome yellow and molybdate orange; and ferrocyanide-based pigments such as Prussian blue. Furthermore, examples of the organic pigment and organic dye as the colorant include: phthalocyanine-based dyes/pigments such as copper phthalocyanine blue and copper phthalocyanine green; azo-based dyes/pigments such as nickel azo yellow; condensed polycyclic dyes/pigments such as thioindigo-based, perinone-based, perylene-based, quinacridone-based, dioxazine-based, isoindolinone-based and quinophthalone-based condensed polycyclic dyes/pigments; and quinoline-based, anthraquinone-based, heterocyclic ring-based and methyl-based dyes/pigments. Among them, titanium oxide, carbon black, and cyanine-based, quinoline-based, anthraquinone-based and phthalocyanine-based dyes/pigments and the like are preferable in terms of heat stability. A single dye/pigment may be contained or two or more dyes/pigments may be contained in any combination at any ratio. Furthermore, the dye/pigment may be used in a masterbatch with a polystyrene-based resin, a polycarbonate-based resin or an acrylic resin for the purposes of improving handling property upon extrusion and improving dispersibility in a resin composition.

The proportion of the colorant added, if any, is, for example, 5 parts by mass or less, preferably 3 parts by mass or less and more preferably 2 parts by mass or less with respect to 100 parts by mass of the polycarbonate resin. If the proportion of the colorant added is too large, impact resistance of the molded article may be insufficient.

<Method for Producing Polycarbonate Resin>

While the polycarbonate resin of the present invention can be synthesized based on a known method, it is preferably synthesized by an interfacial polymerization method in order to keep the amount of a low-molecular-weight carbonate compound having a molecular weight of 1,000 or less to be less than 1 mass % without employing an additional purification step. Alternatively, the polycarbonate resin of the present invention may be synthesized by a method described as a second aspect of the present invention. The second aspect will be described below.

Hereinafter, a method for producing the polycarbonate resin of the present invention by an interfacial polymerization method will be described in detail. A dihydric phenol is dissolved in an aqueous alkaline solution in the presence of an organic solvent inert to reaction and the aqueous alkaline solution, keeping usual pH at 10 or higher. Phosgene is blown into this solution to form a polycarbonate precursor through phosgenation reaction between phosgene and the dihydric phenol. At the end of phosgene blowing, a terminating agent followed by a polymerization catalyst such as a tertiary amine or a quaternary ammonium salt are added to allow polycondensation reaction. Upon doing so, the terminating agent is dissolved in a solvent so as to be added as a terminating agent solution so that the amount of a low-molecular-weight carbonate compound having a molecular weight of 1,000 or less can be reduced in the resulting polycarbonate resin. Specifically, the concentration of the terminating agent in the terminating agent solution is preferably less than 10 mass % so that the amount of a low-molecular-weight carbonate compound having a molecular weight of 1,000 or less in the resulting polycarbonate resin can be made less than 1 mass %. The concentration of the terminating agent in the terminating agent solution is more preferably less than 7 mass % and still more preferably less than 5 mass %.

The low-molecular-weight carbonate compound with a molecular weight of 1,000 or less is as small as less than 1 mass % in the polycarbonate resin obtained as described above, and the viscosity-average molecular weight (Mv) of said polycarbonate resin is 10,000-18,000. Accordingly, it is a polycarbonate resin which has high fluidity and with which mold fouling such as mold deposits can be reduced.

Phosgene is used usually in a range of 100-120 mol and preferably in a range of 105-115 mol with respect to 100 mol of the above-described dihydric phenol. While carbonyl chloride called phosgene is preferably used according to the present invention, any halogenated carbonyl other than chlorine can be used without any problems. In addition, time for blowing phosgene is usually 10-120 minutes and preferably 15-60 minutes.

For the reaction between the dihydric phenol and phosgene, a base is usually used, where an alkali metal compound such as sodium hydroxide or potassium hydroxide, or an alkaline earth metal compound can be used as the base. The equivalent ratio of the dihydric phenol and the above-mentioned base is preferably 1:1.1-1.6. Such a base is usually used in a form of an aqueous solution, in which the base is usually used at a concentration of 6-20 mass %. Water used here is distilled water, ion exchange water, water collected upon producing the polycarbonate, or else. In order to prevent oxidation coloring of the dihydric phenol, sodium sulfite, sodium hydrosulfite, sodium borohydride or the like can be used upon reaction.

Moreover, in order to further facilitate the phosgenation reaction and the polymerization reaction, an organic solvent is used. The organic solvent used is insoluble in water, inert to the reaction, and is capable of dissolving the polycarbonate resulting from the reaction. As such an organic solvent, a chlorinated aliphatic hydrocarbon such as methylene chloride, tetrachloroethane, chloroform, 1,2-dichloroethylene, trichloroethane or dichloroethane, a chlorinated aromatic hydrocarbon such as chlorobenzene, dichlorobenzene, chlorotoluene, or acetophenone, cyclohexane or anisole alone or a mixture thereof is preferably used. Among them, methylene chloride is most preferably used. 0.1-5 liters of the above-mentioned organic solvent is used per mol of the dihydric phenol.

According to the present invention, the timing of adding the terminating agent solution is not particularly limited as long as it is between the phosgenation to the beginning of the polymerization reaction, but it is preferably added subsequent to the phosgene blowing step.

According to the present invention, a base that is again added together with the terminating agent is necessary to perform complete condensation reaction between the terminating agent and resin terminal Cl group. If the alkali concentration in the reaction solution is too high prior to the addition of the terminating agent, reaction between the resin terminal Cl group and the base occurs frequently such that the resin terminal becomes OH group, by which the molecular weight becomes difficult to control and a polymer desired may not be achieved. If no base is added together with the terminating agent, reaction with the terminating agent will be delayed, which may cause disadvantage of increasing the molecular weight of the polymer too much.

With respect to addition of the above-described terminating agent, the polymerization accelerating catalyst is preferably added after addition of the base. Furthermore, polymerization is completed by stirring for 30-120 minutes after adding the terminating agent to the reaction mixture.

As the polymerization accelerating catalyst used with the present invention, a tertiary amine such as triethylamine, a tertiary phosphine, a quaternary phosphonium salt, a nitrogen-containing heterocyclic ring compound or a salt thereof, an iminoether or a salt thereof, or a compound having an amide group can be used. Among them, a tertiary amine such as triethylamine is preferable. The amount of the polymerization accelerating catalyst added is 0.1-10 mmol per mol of the fed dihydric phenol.

The polycarbonate resin of the present invention is usually produced in a batch mode. As a production apparatus for this batch mode, a reaction furnace with a jacket equipped with a stirring device, a gas blow tube and a condenser is used. While the stirring device is not particularly limited, it is preferably an auto-reverse stirrer. The reversing rate is 70-200 times/min upon phosgene blowing, and 70-230 times/min from the addition of the terminating agent through the end of the reaction. Preferably, the reaction temperature is 10-25° C. upon phosgene blowing and 20-35° C. from the addition of the terminating agent through the end of the reaction.

[Evaluation Method]

<Molecular Weight>

The molecular weight of the polycarbonate resin contained in a molded article of the present invention is evaluated by a viscosity-average molecular weight (Mv) measured with an Ubbelohde viscometer under the following conditions.

<Conditions for Measuring Viscosity-Average Molecular Weight (Mv)>

Measurement instrument: Ubbelohde capillary viscometer

Solvent: dichloromethane

Concentration of resin solution: 0.5 grams/deciliter

Measurement temperature: 25° C.

Subsequent to the measurement under the above-mentioned conditions, an intrinsic viscosity [η] deciliters/grams is determined at a Huggins coefficient of 0.45 to calculate the viscosity-average molecular weight by Numerical formula (II) below.

$$\eta = 1.23 \times 10^{-4} \times Mv^{0.83} \qquad (II)$$

A viscosity-average molecular weight (Mv) of the polycarbonate resin of the present invention is 10,000-18,000, preferably 11,000-15,000, and more preferably 12,000-14,500. A viscosity-average molecular weight (Mv) greater than 10,000 can enhance the mechanical strength while a viscosity-average molecular weight (Mv) of 18,000 or less can reduce the melt viscosity and enhance fluidity, thereby facilitating molding of a thin large-sized molded product.

<Measurement of Amount of Low-Molecular-Weight Carbonate Compound>

The amount of a low-molecular-weight carbonate compound having a molecular weight of 1,000 or less contained in the polycarbonate resin of the present invention is evaluated by gel permeation chromatography that is performed under the following conditions.

<Conditions for Gel Permeation Chromatography Measurement>

Measurement instrument: HLC-8320GPC from Tosoh Corporation
Columns: Shodex K-G+K-805L×2+K-800D
Eluent: chloroform
Temperature: Thermostatic tank for columns at 40° C.
Flow rate: 1.0 ml/min
Concentration: 0.1 wt/vol %
Injected amount: 100 μl
Pretreatment: Filtration with 0.45 μm filter
Detector: Differential refractometer (RI)

Measurement is conducted under the above-described conditions to determine the molecular weight distribution of the sample in terms of polystyrene. Based on that result, the amount of the low-molecular-weight carbonate compound having a molecular weight of less than 1,000 [mass %] can be calculated.

<Volumetric Flow Rate (Q Value)>

The melt fluidity of the polycarbonate resin of the present invention is evaluated by a volumetric flow rate (Q value) determined with a Koka type flow tester under the following conditions. High Q value represents high melt fluidity whereas low Q value represents low melt fluidity.

<Conditions for Determining Q Value>

Measurement instrument: Koka type flow tester
Load: 160 kgf/cm$^2$
Orifice: diameter 1 mm×length 10 mm
Measurement temperature: 240° C.

For this test, for example, CFT-500D from Shimadzu Corporation can be used.

The Q value of the polycarbonate resin of the present invention determined under the above-described conditions at a measurement temperature of 240° C. is $10×10^{-2}$ cc/sec or higher, preferably $13×10^{-2}$ cc/sec or higher, particularly preferably $15×10^{-2}$ cc/sec or higher and most preferably $19×10^{-2}$ cc/sec or higher. In addition, the Q value is preferably $100×10^{-2}$ cc/sec or lower and more preferably $80×10^{-2}$ cc/sec or lower. If the Q value is $100×10^{-2}$ cc/sec or lower, molding defects such as sprue break and cavity generation are likely to be prevented. Such ranges allow molding of a thin large-sized molded article.

<Mold Fouling>

An injection molding machine ("HSP100A" from Sodick) was used to mold 3.5-inch thin test pieces with a thickness of 0.4 mm by continuous 350-shot molding at a resin temperature of 340° C. and a mold temperature of 80° C. Then, the mold adhering matters after the molding are observed for evaluation.

[Applications]

Since the polycarbonate resin of the present invention has high fluidity and is capable of reducing mold fouling such as mold deposits as compared to conventional polycarbonate resins, it is suitable for a light guide member incorporated into an automobile lighting apparatus, a liquid crystal backlight unit, various display devices, and a light guide plate used in the lighting apparatus field. Examples of the apparatus that can incorporate such a light guide plate include mobile terminals such as a mobile phone, a mobile notebook, a netbook, a slate PC, a tablet PC, a smartphone and a tablet-type terminal, a camera, a watch, a laptop computer, various displays and a lighting instrument. In one aspect of the present invention, a light guide plate comprising the polycarbonate resin of the present invention is provided.

<Second Aspect>

A second aspect comprises, for example, the following invention.

A method for producing a polycarbonate resin by interfacial polymerization reaction using a dihydric phenol and a terminating agent represented by general formula (1a) below:

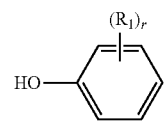

(1a)

where, $R_1$ represents a halogen atom, a C5-14 alkyl group, a C1-23 alkyloxy group or a C2-23 alkyl ester group; and r represents an integer of 1-5,
the method comprising, for the interfacial polymerization reaction, a step of adding a terminating agent solution containing the terminating agent at a concentration of less than 10 mass % to a solution containing the dihydric phenol.

Hereinafter, the above-mentioned invention will be described in detail.

<Method for Producing Polycarbonate Resin>

According to one embodiment of the present invention, there is provided a method for producing a polycarbonate resin by interfacial polymerization reaction using a dihydric phenol and a terminating agent represented by general formula (1a) below:

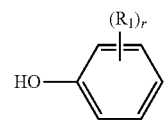

(1a)

where, $R_1$ represents a halogen atom, a C5-14 alkyl group, a C1-23 alkyloxy group or a C2-23 alkyl ester group; and r represents an integer of 1-5,
the method comprising, for the interfacial polymerization reaction, a step of adding a terminating agent solution containing the terminating agent at a concentration of less than 10 mass % to a solution containing the dihydric phenol.

According to a conventional method for producing a polycarbonate resin, for interfacial polymerization reaction, a terminating agent in a solid state is directly added to a solution containing a dihydric phenol so that reaction takes place while the terminating agent is dissolved in the solution containing the dihydric phenol (Patent documents 1-3). On the other hand, according to the production method of the present invention, a terminating agent represented by general formula (1a) is dissolved in a solvent in advance before feeding it into a solution containing a dihydric phenol for polymerization. By using such a terminating agent solution at a predetermined concentration, a polycarbonate resin in which the amount of a low-molecular-weight carbonate compound having a molecular weight of 1,000 or less contained is less than 1 mass % can be obtained without conducting special operations as described in Patent documents 4 and 5.

Next, one aspect of the production method of the present invention will be described but the present invention should not be limited to this method. First, a dihydric phenol is dissolved in an aqueous alkaline solution in the presence of an organic solvent inert to reaction and the aqueous alkaline solution, keeping usual pH at 10 or higher. Phosgene (a carbonate ester forming compound) is blown into this solution to form a polycarbonate precursor through phosgenation reaction between phosgene and the dihydric phenol. At the end of phosgene blowing, a terminating agent followed by a polymerization catalyst such as a tertiary amine or a quaternary ammonium salt are added to allow polycondensation reaction. Upon doing so, a terminating agent solution containing the terminating agent at a concentration of less than 10 mass % can be added so that the amount of a low-molecular-weight carbonate compound having a molecular weight of 1,000 or less can be reduced to less than 1 mass % in the resulting polycarbonate resin. The concentration of the terminating agent in the terminating agent solution is preferably less than 7 mass % and more preferably less than 5 mass %. Furthermore, the lower limit amount of a low-molecular-weight carbonate compound having a molecular weight of 1,000 or less contained in the polycarbonate resin is preferably around 0.01 mass % due to a trade-off regarding purification cost.

Phosgene is used usually in a range of 100-140 mol, preferably in a range of 100-120 mol and more preferably in a range of 105-115 mol with respect to 100 mol of the above-described dihydric phenol. While carbonyl chloride called phosgene is preferably used as a carbonate ester forming compound according to the present invention, any carbonate ester forming compound other than phosgene that will be mentioned below can favorably be used as well. In addition, time for blowing phosgene is usually 10-120 minutes and preferably 15-60 minutes.

For the reaction between the dihydric phenol and phosgene, a base is usually used, where an alkali metal compound such as sodium hydroxide or potassium hydroxide, or an alkaline earth metal compound can be used as the base. The equivalent ratio of the dihydric phenol and the abovementioned base is preferably 1:1.1-2.0, and more preferably 1:1.1-1.6. Such a base is usually used in a form of an aqueous solution, in which the base is usually used at a concentration of 6-20 mass %. Water used here is distilled water, ion exchange water, water collected upon producing the polycarbonate, or else. In order to prevent oxidation coloring of the dihydric phenol, sodium sulfite, sodium hydrosulfite, sodium borohydride or the like can be used upon reaction.

Furthermore, in order to further facilitate the phosgenation reaction and the polymerization reaction, an organic solvent is used. The organic solvent used is insoluble in water, inert to the reaction, and is capable of dissolving polycarbonate generated by the reaction. As such an organic solvent, a chlorinated aliphatic hydrocarbon such as methylene chloride, tetrachloroethane, chloroform, 1,2-dichloroethylene, trichloroethane or dichloroethane, a chlorinated aromatic hydrocarbon such as chlorobenzene, dichlorobenzene or chlorotoluene, acetophenone, cyclohexane or anisole alone or a mixture thereof is preferably used. Among them, methylene chloride is most preferably used. 0.1-5 liters of the above-mentioned organic solvent is used per mol of the dihydric phenol.

According to the present invention, the timing of adding the terminating agent solution is not particularly limited as long as it is between the phosgenation to the beginning of the polymerization reaction, but it is preferably added subsequent to the phosgene blowing step.

According to the present invention, a base that is again added together with the terminating agent is necessary to perform complete condensation reaction between the terminating agent and resin terminal Cl group. If the alkali concentration in the reaction solution is too high prior to the addition of the terminating agent, reaction between the resin terminal Cl group and the base occurs frequently such that the resin terminal becomes OH group, by which the molecular weight becomes difficult to control and a polymer desired may not be achieved. If no base is added together with the terminating agent, reaction with the terminating agent will be delayed, which may cause disadvantage of increasing the molecular weight of the polymer too much.

With respect to addition of the above-described terminating agent, the polymerization accelerating catalyst is preferably added after addition of the base. Furthermore, polymerization is completed by stirring for 30-120 minutes after adding the terminating agent to the reaction mixture.

As the polymerization accelerating catalyst used with the present invention, a tertiary amine such as triethylamine, a tertiary phosphine, a quaternary phosphonium salt, a nitrogen-containing heterocyclic ring compound or a salt thereof, an iminoether or a salt thereof, or a compound having an amide group can be used. Among them, a tertiary amine such as triethylamine is preferable. The amount of the polymerization accelerating catalyst added is 0.1-10 mmol per mol of the fed dihydric phenol.

The production method of the present invention is usually conducted in a batch mode. As a production apparatus for this batch mode, a reaction furnace with a jacket equipped with a stirring device, a gas blow tube and a condenser is used. While the stirring device is not particularly limited, it is preferably an auto-reverse stirrer. The reversing rate is 70-200 times/min upon phosgene blowing, and 70-230 times/min from the addition of the terminating agent through the end of the reaction. Preferably, the reaction temperature is 10-25° C. upon phosgene blowing and 20-35° C. from the addition of the terminating agent through the end of the reaction.

Hereinafter, materials used for the production method of the present invention will be described in more detail although the materials should not be limited thereto.

<Dihydric Phenol and Carbonate Ester Forming Compound>

Since the dihydric phenol and the carbonate ester forming compound used in the production method of the present invention are the same as those described in the first aspect, the descriptions thereof will be omitted.

<Terminating Agent>

The terminating agent used in the production method of the present invention is also the same as that described in the first aspect and thus the description thereof will be omitted. In a preferable aspect of the production method of the present invention, $R_{32}$, $R_{33}$ and $R_{34}$ in general formulae (7a), (8a) and (9a), respectively, represent one or more selected from the group consisting of a n-octyl group, an iso-octyl group, a t-octyl group and a dodecyl group.

<Amount of Terminating Agent (Monohydric Phenol) Used>

Since the amount of the terminating agent (monohydric phenol) used in the production method of the present invention is the same as that described in the first aspect, the description thereof will be omitted.

[Other Resins that can be Mixed]

Since other resins that can be mixed, if necessary, with the polycarbonate resin obtained by the production method of the present invention is the same as that described in the first aspect, the description thereof will be omitted.

[Additives]

Since various additives that can be blended with the polycarbonate resin obtained by the production method of the present invention without departing from the intention of the present invention are the same as those described in the first aspect, the description thereof will be omitted.

[Polycarbonate Resin]

A polycarbonate resin obtained by the production method according to the present invention has a terminal structure represented by general formula (1) below, and is characterized in that the amount of the low-molecular-weight carbonate compound having a molecular weight of 1,000 or less is less than 1 mass %.

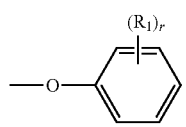

(1)

where, $R_1$ represents a halogen atom, a C5-14 alkyl group, a C1-23 alkyloxy group or a C2-23 alkyl ester group; and r represents an integer of 1-5.

In a preferable aspect, the terminal structure represented by general formula (1) above has a structure represented by general formula (7), (8) or (9) below.

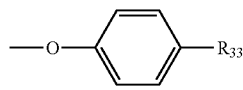

(7)

where, $R_{33}$ represents a C5-14 alkyl group.

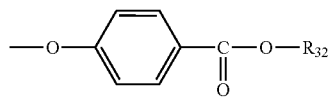

(8)

where, $R_{32}$ represents a C1-22 alkyl group.

(9)

where, $R_{34}$ represents a C1-23 alkyl group.

In a more preferable aspect, $R_{32}$, $R_{33}$ and $R_{34}$ in general formulae (7), (8) and (9), respectively, each represent one or more selected from the group consisting of a n-octyl group, an iso-octyl group, a t-octyl group and a dodecyl group.

Although the structural unit of the polycarbonate resin produced by the method of the present invention is not particularly limited, it preferably comprises a structural unit represented by general formula (2) below.

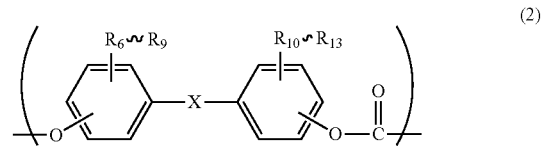

(2)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group; the substituents are each independently halogen, a C1-20 alkyl group or a C6-12 aryl group; and X represents any structure selected from the group consisting of a single bond, —O—, —S—, —SO—, —SO$_2$—, —CO— and general formulae (3) to (6) below. Preferably, X has the structure represented by general formula (3) above.

The amount of a low-molecular-weight carbonate compound having a molecular weight of 1,000 or less contained in the polycarbonate resin obtained by the production method of the present invention is less than 1 mass %. The low-molecular-weight carbonate compound with a molecular weight of 1,000 or less comprises, for example, a dicarbonate compound which is a condensation reaction product between dichloroformate of a dihydric phenol generated by phosgenation reaction of the dihydric phenol and a terminating agent.

When a polycarbonate resin that contains a large amount of a low-molecular-weight carbonate compound with a molecular weight of 1,000 or less is used for continuous injection molding or the like to produce discs or complicated and thinned products, it is likely to generate a minute amount of adhering matters (mold deposits) at a relatively early stage, that cause contamination of the mold. In this regard, contamination of the mold can effectively be prevented and thus is preferable if the amount of a low-molecular-weight carbonate compound having a molecular weight of 1,000 or less is less than 1 mass %.

A viscosity-average molecular weight (Mv) of the polycarbonate resin obtained by the production method of the present invention is preferably 10,000-18,000, more preferably 11,000-15,000, and still more preferably 12,000-14,500. A viscosity-average molecular weight (Mv) greater than 10,000 can enhance the mechanical strength while a viscosity-average molecular weight (Mv) of 18,000 or less can reduce the melt viscosity and enhance fluidity, thereby facilitating molding of a thin large-sized molded product.

[Evaluation Method]

Since the methods for evaluating various physical properties of the polycarbonate resin obtained by the production method of the present invention are the same as those described in the first aspect, the descriptions thereof will be omitted.

[Applications]

Since the applications of the polycarbonate resin obtained by the production method of the present invention are the same as those described in the first aspect, the descriptions thereof will be omitted.

EXAMPLES

Hereinafter, the present invention will be described in more detail by way of examples, although the present invention should not be limited to the following examples as long as it is within the scope thereof.

<Measurement of Molecular Weight>

The molecular weight of a polycarbonate resin contained in a molded article obtained in each of the present examples was evaluated by the viscosity-average molecular weight (Mv) measured using an Ubbelohde viscometer under the following conditions.

<Conditions for Measuring Viscosity-Average Molecular Weight (Mv)>

Measurement instrument: Ubbelohde capillary viscometer

Solvent: dichloromethane

Concentration of resin solution: 0.5 grams/deciliter

Measurement temperature: 25° C.

Subsequent to the measurement under the above-mentioned conditions, an intrinsic viscosity [η] deciliters/grams was determined at a Huggins coefficient of 0.45 to calculate the viscosity-average molecular weight by Numerical formula (11) below.

$$\eta = 1.23 \times 10^{-4} \times Mv^{0.83} \quad (I)$$

<Conditions for Gel Permeation Chromatography Measurement>

Measurement instrument: HLC-8320GPC from Tosoh Corporation

Columns: Shodex K-G+K-805L×2+K-800D

Eluent: chloroform

Temperature: Thermostatic tank for columns at 40° C.

Flow rate: 1.0 ml/min

Concentration: 0.1 wt/vol %

Injected amount: 100 μl

Pretreatment: Filtration with 0.45 pun filter

Detector: Differential refractometer (RI)

Measurement was conducted under the above-described conditions to determine the molecular weight distribution of the sample in terms of polystyrene. Based on that result, the amount of the low-molecular-weight carbonate compound having a molecular weight of less than 1,000 [mass %] was calculated.

<Conditions for Determining Q Value>

Measurement instrument: flow tester (device for evaluating flow behavior)

Load: 160 kgf/cm$^2$

Orifice: diameter 1 mm × length 10 mm

Measurement temperature: 240° C.

Measurement instrument: CFT-500D from Shimadzu Corporation

<Mold Fouling>

An injection molding machine ("HSP100A" from Sodick) was used to mold 3.5-inch thin test pieces with a thickness of 0.4 mm by continuous 350-shot molding at a resin temperature of 340° C. and a mold temperature of 80° C. Then, the mold adhering matters after the molding are observed for evaluation. In this regard, those that were good without any problem were evaluated "good" (i.e., acceptable) while those that caused fouling and thus defective were evaluated "poor" (i.e., unacceptable).

Production of Terminating Agent

Production Example 1

Based on pages 210-212 of the Handbook of Organic Chemicals (3rd edition: edited by SSOCJ: published by Gihodo Shuppan), phenol from Tokyo Chemical Industry and 2,4,4-trimethyl-1-pentene from Tokyo Chemical Industry were used for alkylation to obtain para-t-octyl phenol represented by the following chemical formula (terminating agent 1).

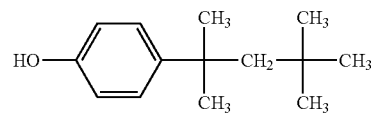

Production Example 2

Based on pages 143-150 of the Handbook of Organic Chemicals (3rd edition: edited by SSOCJ: published by Gihodo Shuppan), 4-hydroxybenzoate from Tokyo Chemical Industry and 2-ethylhexanol from Mitsubishi Chemical were used for esterification through dehydration reaction to obtain para-hydroxybenzoate 2-ethylhexyl ester represented by the following chemical formula (terminating agent 2).

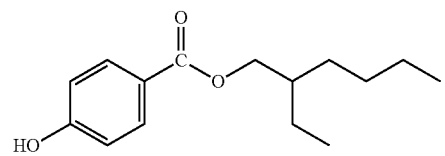 [SMILES: CCCCC(CC)COC(=O)c1ccc(O)cc1]

Production Example 3

Based on pages 138-140 of the Handbook of Organic Chemicals (3rd edition: edited by SSOCJ: published by Gihodo Shuppan), hydroquinone from Tokyo Chemical Industry and octanol from Tokyo Chemical Industry were used for etherification to obtain para-n-octyloxy phenol represented by the following chemical formula (terminating agent 3).

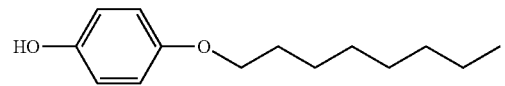 [SMILES: CCCCCCCCOc1ccc(O)cc1]

Production of Polycarbonate Resin

Example 1

To 43.5 kg of a 9 w/w % aqueous sodium hydroxide solution, 7 kg of bisphenol A (BPA) from Nippon Steel & Sumikin Chemical and 35 g of hydrosulfite were added to be dissolved therein. To this, 17.2 kg of dichloromethane was added, and 4.1 kg of phosgene was blown into the resultant by spending 30 minutes while stirring and keeping the solution temperature to lie within a range of 15° C.-25° C.

After the phosgene blowing, 5 kg of a 9 w/w % aqueous sodium hydroxide solution, and a solution obtained by dissolving 714 g of terminating agent 1 described above into 70.7 kg of dichloromethane (concentration of the terminating agent in the solution (ST concentration): 1 mass %) were added and vigorously stirred for emulsification. Thereafter, 13.7 g of triethylamine as a polymerization catalyst was added to allow polymerization for about 40 minutes.

The polymerization solution was separated into a water phase and an organic phase, the organic phase was neutralized with phosphate, and washing with pure water was repeated until the pH of the washing liquid became neutral. The organic solvent was evaporated and distilled away from this purified polycarbonate resin solution to obtain polycarbonate resin powder.

The resulting polycarbonate resin powder was melt kneaded with a 40-mm vented single-screw extruder ("VS-40" from Tanabe Plastics Machinery) at a cylinder temperature of 240° C. to obtain pellets by strand cutting.

The resulting polycarbonate resin pellets were used to carry out viscosity-average molecular weight measurement, gel permeation chromatography measurement and Q value measurement. As a result, the viscosity-average molecular weight was 11,000, the amount of a low-molecular-weight carbonate compound having a molecular weight of less than 1,000 was 0.85 mass %, and the Q value was $69 \times 10^{-2}$ cc/sec.

The resulting pellets were dried with a hot-air circulation type drier at 120° C. for 4-6 hours, and then subjected to continuous molding using an injection molding machine ("HSP100A" from Sodick) at a resin temperature of 340° C. and a mold temperature of 80° C. to obtain 3.5-inch thin test pieces with a thickness of 0.4 mm. Mold fouling was not significant Example 2

Polycarbonate resin pellets and a molded article were obtained in the same manner as Example 1 except that a solution obtained by dissolving 669 g of terminating agent 1 into 21.6 kg of dichloromethane (concentration of the terminating agent in the solution: 3%) was used.

The viscosity-average molecular weight of the resulting polycarbonate resin was 12,000, the amount of a low-molecular-weight carbonate compound having a molecular weight of less than 1,000 was 0.94 mass %, and the Q value was $56 \times 10^{-2}$ cc/sec, showing no significant mold fouling.

Example 3

Polycarbonate resin pellets and a molded article were obtained in the same manner as Example 1 except that 5 kg of a 9 w/w % aqueous sodium hydroxide solution, 3.4 kg of dichloromethane and a solution obtained by dissolving 574 g of terminating agent 1 into 13.8 kg of dichloromethane (concentration of the terminating agent in the solution: 4%) were used after the phosgene blowing.

The viscosity-average molecular weight of the resulting polycarbonate resin was 13,500, the amount of a low-molecular-weight carbonate compound having a molecular weight of less than 1,000 was 0.83 mass %, and the Q value was $20 \times 10^{-2}$ cc/sec, showing no significant mold fouling.

Example 4

Polycarbonate resin pellets and a molded article were obtained in the same manner as Example 1 except that 5 kg of a 9 w/w % aqueous sodium hydroxide solution, 11.4 kg of dichloromethane and a solution obtained by dissolving 574 g of terminating agent 1 into 9 kg of dichloromethane (concentration of the terminating agent in the solution: 6%) were used after the phosgene blowing.

The viscosity-average molecular weight of the resulting polycarbonate resin was 13,500, the amount of a low-molecular-weight carbonate compound having a molecular weight of less than 1,000 was 0.93 mass %, and the Q value was $19 \times 10^{-2}$ cc/sec, showing no significant mold fouling.

Example 5

Polycarbonate resin pellets and a molded article were obtained in the same manner as Example 1 except that 5 kg of a 9 w/w % aqueous sodium hydroxide solution, 9 kg of dichloromethane and a solution obtained by dissolving 487 g of terminating agent 1 into 7.6 kg of dichloromethane (concentration of the terminating agent in the solution: 6%) were used after the phosgene blowing.

The viscosity-average molecular weight of the resulting polycarbonate resin was 14,500, the amount of a low-molecular-weight carbonate compound having a molecular weight of less than 1,000 was 0.62 mass %, and the Q value was $13 \times 10^{-2}$ cc/sec, showing no significant mold fouling.

Example 6

Polycarbonate resin pellets and a molded article were obtained in the same manner as Example 1 except that 5 kg of a 9 w/w % aqueous sodium hydroxide solution, 10.3 kg of dichloromethane and a solution obtained by dissolving 396 g of terminating agent 1 into 6.2 kg of dichloromethane (concentration of the terminating agent in the solution: 6%) were used after the phosgene blowing.

The viscosity-average molecular weight of the resulting polycarbonate resin was 16,000, the amount of a low-molecular-weight carbonate compound having a molecular weight of less than 1,000 was 0.58 mass %, and the Q value was $10 \times 10^{-2}$ cc/sec, showing no significant mold fouling.

Example 7

Polycarbonate resin pellets and a molded article were obtained in the same manner as Example 6 except that terminating agent 2 was used instead of terminating agent 1, and a solution obtained by dissolving 693 g of terminating agent 2 into 10.9 kg of dichloromethane (concentration of the terminating agent in the solution: 6%) was used.

The viscosity-average molecular weight of the resulting polycarbonate resin was 14,500, the amount of a low-molecular-weight carbonate compound having a molecular weight of less than 1,000 was 0.09 mass %, and the Q value was $38 \times 10^{-2}$ cc/sec, showing no significant mold fouling.

Example 8

Polycarbonate resin pellets and a molded article were obtained in the same manner as Example 3 except that terminating agent 3 was used instead of terminating agent 1, and 5 kg of a 9 w/w % aqueous sodium hydroxide solution, 1.9 kg of dichloromethane and a solution obtained by dissolving 616 g of terminating agent 3 into 14.8 kg of dichloromethane (concentration of the terminating agent in the solution: 4%) were used after the phosgene blowing.

The viscosity-average molecular weight of the resulting polycarbonate resin was 14,400, the amount of a low-molecular-weight carbonate compound having a molecular weight of less than 1,000 was 0.48 mass %, and the Q value was $34 \times 10^{-2}$ cc/sec, showing no significant mold fouling.

Example 9

Polycarbonate resin pellets and a molded article were obtained in the same manner as Example 8 except that 5 kg of a 9 w/w % aqueous sodium hydroxide solution, 7.2 kg of dichloromethane and a solution obtained by dissolving 616 g of terminating agent 3 into 9.7 kg of dichloromethane (concentration of the terminating agent in the solution: 6%) were used after the phosgene blowing.

The viscosity-average molecular weight of the resulting polycarbonate resin was 14,400, the amount of a low-molecular-weight carbonate compound having a molecular weight of less than 1,000 was 0.56 mass %, and the Q value was $34 \times 10^{-2}$ cc/sec, showing no significant mold fouling.

Comparative Example 1

Polycarbonate resin pellets and a molded article were obtained in the same manner as Example 1 except that 5 kg of a 9 w/w % aqueous sodium hydroxide solution, 8.4 kg of dichloromethane and a solution obtained by dissolving 910 g of terminating agent 1 into 8.1 kg of dichloromethane (concentration of the terminating agent in the solution: 10%) were used after the phosgene blowing.

The viscosity-average molecular weight of the resulting polycarbonate resin was 9,000, the amount of a low-molecular-weight carbonate compound having a molecular weight of less than 1,000 was 2.51 mass %, and the Q value was $99 \times 10^{-2}$ cc/sec, showing significant mold fouling.

Comparative Example 2

Polycarbonate resin pellets and a molded article were obtained in the same manner as Example 4 except that a solution obtained by dissolving 574 g of terminating agent 1 into 5.1 kg of dichloromethane (concentration of the terminating agent in the solution: 10%) was used.

The viscosity-average molecular weight of the resulting polycarbonate resin was 13,600, the amount of a low-molecular-weight carbonate compound having a molecular weight of less than 1,000 was 1.2 mass %, and the Q value was $18 \times 10^{-2}$ cc/sec, showing significant mold fouling.

Comparative Example 3

Polycarbonate resin pellets and a molded article were obtained in the same manner as Example 1 except that 5 kg of a 9 w/w % aqueous sodium hydroxide solution, 13.8 kg of dichloromethane and a solution obtained by dissolving 487 g of terminating agent 1 into 2.8 kg of dichloromethane (concentration of the terminating agent in the solution: 15%) were used after the phosgene blowing.

The viscosity-average molecular weight of the resulting polycarbonate resin was 14,500, the amount of a low-molecular-weight carbonate compound having a molecular weight of less than 1,000 was 1.23 mass %, and the Q value was $13 \times 10^{-2}$ cc/sec, showing significant mold fouling.

Comparative Example 4

Polycarbonate resin pellets and a molded article were obtained in the same manner as Example 1 except that 5 kg of a 9 w/w % aqueous sodium hydroxide solution, 14.2 kg of dichloromethane and a solution obtained by dissolving 264 g of terminating agent 1 into 2.3 kg of dichloromethane (concentration of the terminating agent in the solution: 10%) were used after the phosgene blowing.

The viscosity-average molecular weight of the resulting polycarbonate resin was 20,000, the amount of a low-molecular-weight carbonate compound having a molecular weight of less than 1,000 was 0.67 mass %, and the Q value was $1 \times 10^{-2}$ cc/sec, showing no significant mold fouling.

Comparative Example 5

Polycarbonate resin pellets and a molded article were obtained in the same manner as Example 1 except that terminating agent 4 (para-t-butyl phenol from Tokyo Chemical Industry) was used instead of terminating agent 1, and a solution obtained by dissolving 522 g of terminating agent 4 into 51.6 kg of dichloromethane (concentration of the terminating agent in the solution: 1%) was used.

The viscosity-average molecular weight of the resulting polycarbonate resin was 11,000, the amount of a low-molecular-weight carbonate compound having a molecular weight of less than 1,000 was 1.13 mass %, and the Q value was $62 \times 10^{'2}$ cc/sec, showing significant mold fouling.

The results obtained in Examples 1-9 and Comparative examples 1-5 are shown in the following table.

TABLE 1

| | Dihydric phenol | Terminating agent | ST concentration | Mv | Proportion of low-molecular-weight body contained [mass %] | Mold fouling | Fluidity (Q value) [×10$^{-2}$ cc/sec] |
|---|---|---|---|---|---|---|---|
| Example 1 | BPA | 1 | 1 | 11,000 | 0.85 | good | 69 |
| Example 2 | BPA | 1 | 3 | 12,000 | 0.94 | good | 56 |
| Example 3 | BPA | 1 | 4 | 13,500 | 0.83 | good | 20 |
| Example 4 | BPA | 1 | 6 | 13,500 | 0.93 | good | 19 |
| Example 5 | BPA | 1 | 6 | 14,500 | 0.62 | good | 13 |
| Example 6 | BPA | 1 | 6 | 16,000 | 0.58 | good | 10 |
| Example 7 | BPA | 2 | 6 | 14,500 | 0.09 | good | 38 |
| Example 8 | BPA | 3 | 4 | 14,400 | 0.48 | good | 34 |
| Example 9 | BPA | 3 | 6 | 14,400 | 0.56 | good | 34 |
| Comparative example 1 | BPA | 1 | 10 | 9,000 | 2.51 | poor | 99 |
| Comparative example 2 | BPA | 1 | 10 | 13,600 | 1.2 | poor | 18 |
| Comparative example 3 | BPA | 1 | 15 | 14,500 | 1.23 | poor | 13 |
| Comparative example 4 | BPA | 1 | 10 | 20,000 | 0.67 | good | 1 |
| Comparative example 5 | BPA | 4 | 1 | 11,000 | 1.13 | poor | 62 |

The invention claimed is:

1. A polycarbonate resin having a terminal structure represented by general formula (1) below and having a viscosity-average molecular weight of 10,000-18,000, wherein the amount of a low-molecular-weight carbonate compound having a molecular weight of 1,000 or less contained in the polycarbonate resin is less than 1 mass %:

(1)

where, $R_1$ represents a halogen atom, a C5-14 alkyl group, a C1-23 alkyloxy group or a C2-23 alkyl ester group; and r represents an integer of 1-5.

2. The polycarbonate resin according to claim 1, wherein the polycarbonate resin contains a structural unit represented by general formula (2) below:

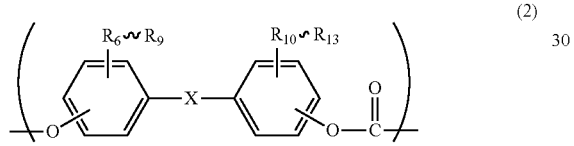

(2)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group;

the substituents are each independently halogen, a C1-20 alkyl group or a C6-12 aryl group; and X represents any structure selected from the group consisting of a single bond, —O—, —S—, —SO—, —SO$_2$—, —CO— and general formulae (3) to (6) below:

(3)

where, $R_{14}$ and $R_{15}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group;

the substituents are each independently halogen, a C1-20 alkyl group or a C6-12 aryl group; and c represents an integer of 1-20;

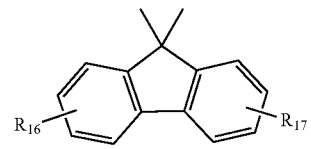

(4)

where, $R_{16}$ and $R_{17}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{16}$ and $R_{17}$ bind to each other to form a C1-20 carbocyclic ring or heterocyclic ring; and the substituents are each independently halogen, a C1-20 alkyl group or a C6-12 aryl group;

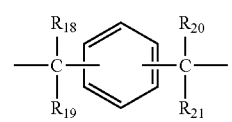

(5)

where, $R_{18}$-$R_{21}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{18}$ and $R_{19}$, and $R_{20}$ and $R_{21}$ respectively bind to each other to form a C1-20 carbocyclic ring or heterocyclic ring; and the substituents are each independently halogen, a C1-20 alkyl group or a C6-12 aryl group; and

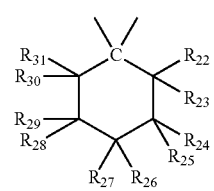

(6)

where, $R_{22}$-$R_{31}$ each independently represent a hydrogen atom or a C1-3 alkyl group.

3. The polycarbonate resin according to claim 1, wherein X in general formula (2) has a structure represented by general formula (3).

4. The polycarbonate resin according to claim 1, wherein the structural unit represented by general formula (2) is a structural unit derived from 2,2-bis(4-hydroxyphenyl)propane.

5. The polycarbonate resin according to claim 1, wherein the terminal structure represented by general formula (1) has a structure represented by general formula (7), (8) or (9) below:

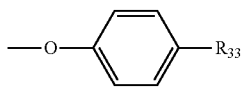
(7)

where, $R_{33}$ represents a C5-14 alkyl group;

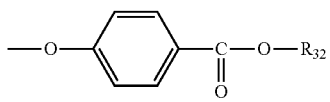
(8)

where, $R_{32}$ represents a C1-22 alkyl group; and

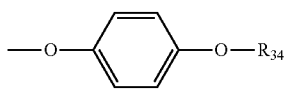
(9)

where, $R_{34}$ represents a C1-23 alkyl group.

6. The polycarbonate resin according to claim 5, wherein $R_{33}$ in general formula (7) is one or more selected from the group consisting of a n-octyl group, an iso-octyl group, a t-octyl group and a dodecyl group.

7. A method for producing a polycarbonate resin by interfacial polymerization reaction using a dihydric phenol and a terminating agent represented by general formula (1a) below:

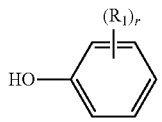
(1a)

where, $R_1$ represents a halogen atom, a C5-14 alkyl group, a C1-23 alkyloxy group or a C2-23 alkyl ester group; and r represents an integer of 1-5, the method comprising, for the interfacial polymerization reaction, a step of adding a terminating agent solution containing the terminating agent at a concentration of less than 10 mass % to a solution containing the dihydric phenol.

8. The method according to claim 7, comprising a step of blowing phosgene into the solution containing the dihydric phenol prior to the step of adding the terminating agent solution.

9. The method according to claim 7, wherein the terminating agent solution comprises a solvent selected from the group consisting of methylene chloride, tetrachloroethane, chloroform, 1,2-dichloroethylene, trichloroethane, dichloroethane, chlorobenzene, dichlorobenzene, chlorotoluene, acetophenone, cyclohexane and anisole.

10. The method according to claim 7, wherein the terminating agent solution comprises methylene chloride.

11. The method according to claim 7, wherein the dihydric phenol is a compound represented by general formula (2a) below:

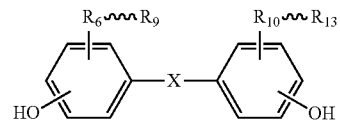
(2a)

where, $R_6$-$R_{13}$ each independently represent any one selected from the group consisting of hydrogen, halogen, an optionally substituted C1-5 alkoxyl group, an optionally substituted C1-20 alkyl group, an optionally substituted C1-5 alkoxy group, an optionally substituted C6-12 aryl group, an optionally substituted C7-17 aralkyl group and an optionally substituted C2-15 alkenyl group;

the substituents are each independently halogen, a C1-20 alkyl group or a C6-12 aryl group; and X represents any structure selected from the group consisting of a single bond, —O—, —S—, —SO—, —SO$_2$—, —CO— and general formulae (3) to (6) below:

(3)

where, $R_{14}$ and $R_{15}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group;

the substituents are each independently halogen, a C1-20 alkyl group or a C6-12 aryl group; and c represents an integer of 1-20;

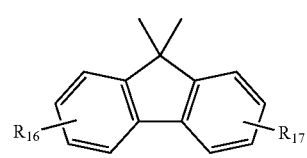
(4)

where, $R_{16}$ and $R_{17}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{16}$ and $R_{17}$ bind to each other to form a C1-20 carbocyclic ring or heterocyclic ring; and the substituents are each independently halogen, a C1-20 alkyl group or a C6-12 aryl group;

(5)

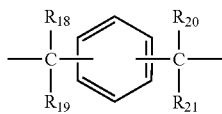

where, $R_{18}$-$R_{21}$ each independently represent any one selected from the group consisting of hydrogen, halogen, an optionally substituted C1-20 alkyl group, an optionally substituted C1-5 alkoxy group, an optionally substituted C6-12 aryl group, an optionally substituted C2-5 alkenyl group and an optionally substituted C7-17 aralkyl group, or $R_{18}$ and $R_{19}$, and $R_{20}$ and $R_{21}$ respectively bind to each other to form a C1-20 carbocyclic ring or heterocyclic ring; and the substituents are each independently halogen, a C1-20 alkyl group or a C6-12 aryl group; and (6)

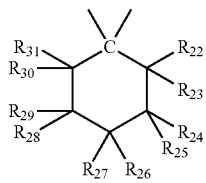

where, $R_{22}$-$R_{31}$ each independently represent a hydrogen atom or a C1-3 alkyl group.

12. The method according to claim 11, wherein X in general formula (2a) has the structure represented by general formula (3).

13. The method according to claim 11, wherein the compound represented by general formula (2a) is 2,2-bis(4-hydroxyphenyl)propane.

14. The method according to claim 7, wherein the terminating agent is a compound represented by general formula (7a), (8a) or (9a) below:

(7a)

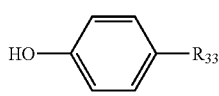

where, $R_{33}$ represents a C5-14 alkyl group;

(8a)

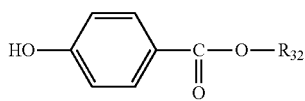

where, $R_{32}$ represents a C1-22 alkyl group; and (9a)

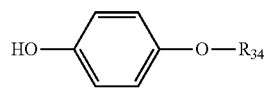

where, $R_{34}$ represents a C1-23 alkyl group.

15. The method according to claim 14, wherein the terminating agent is a compound represented by general formula (7a).

16. The method according to claim 15, wherein $R_{33}$ in general formula (7a) is one or more selected from the group consisting of a n-octyl group, an iso-octyl group, a t-octyl group and a dodecyl group.

17. The method according to claim 7, wherein the viscosity-average molecular weight of the polycarbonate resin is 10,000-18,000.

18. The method according to claim 7, wherein the amount of a low-molecular-weight carbonate compound having a molecular weight of 1,000 or less contained in the polycarbonate resin is less than 1 mass %.

19. A method for producing a polycarbonate resin by interfacial polymerization reaction using a dihydric phenol and a terminating agent represented by general formula (1a) below:

(1a)

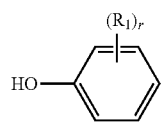

where, $R_1$ represents a halogen atom, a C5-14 alkyl group, a C1-23 alkyloxy group or a C2-23 alkyl ester group; and r represents an integer of 1-5, the method comprising, for the interfacial polymerization reaction, adding a terminating agent solution containing the terminating agent at a concentration of less than 10 mass % to a solution containing the dihydric phenol.

20. The method according to claim 19, comprising blowing phosgene into the solution containing the dihydric phenol prior to the adding the terminating agent solution.

* * * * *